(12) United States Patent
Katsumata et al.

(10) Patent No.: US 10,583,825 B2
(45) Date of Patent: Mar. 10, 2020

(54) CONTROL APPARATUS FOR HYBRID VEHICLE

(71) Applicants: Toyota Jidosha Kabushiki Kaisha, Toyota-shi (JP); Aisin AW Co., Ltd., Anjo-shi (JP)

(72) Inventors: Munehiro Katsumata, Toyota (JP); Hiromichi Kimura, Okazaki (JP); Kazuyuki Shiiba, Miyoshi (JP); Tooru Matsubara, Toyota (JP); Takeshi Kitahata, Miyoshi (JP); Kenta Kumazaki, Anjo (JP); Nobufusa Kobayashi, Anjo (JP); Masato Yoshikawa, Toyota (JP); Takahiro Kimura, Tajimi (JP); Daisuke Suyama, Anjo (JP); Kazuomi Okasaka, Anjo (JP)

(73) Assignees: Toyota Jidosha Kabushiki Kaisha, Toyota-shi (JP); Aisin AW Co., Ltd., Anjo-shi (JP)

( * ) Notice: Subject to any disclaimer, the term of this patent is extended or adjusted under 35 U.S.C. 154(b) by 206 days.

(21) Appl. No.: 15/852,101

(22) Filed: Dec. 22, 2017

(65) Prior Publication Data
US 2018/0178774 A1 Jun. 28, 2018

(30) Foreign Application Priority Data
Dec. 23, 2016 (JP) .................................. 2016-250223

(51) Int. Cl.
*B60W 30/19* (2012.01)
*B60W 20/15* (2016.01)
(Continued)

(52) U.S. Cl.
CPC ............. *B60W 20/10* (2013.01); *B60K 6/365* (2013.01); *B60K 6/445* (2013.01); *B60W 10/06* (2013.01);
(Continued)

(58) Field of Classification Search
CPC .... B60W 20/10; B60W 10/06; B60W 10/115; B60W 30/19; B60W 20/15; B60W 10/08;
(Continued)

(56) References Cited

U.S. PATENT DOCUMENTS

| 2012/0077638 A1* | 3/2012 | Kumazaki | B60K 6/445 477/5 |
| 2012/0108384 A1* | 5/2012 | Tabata | B60K 6/445 477/3 |
| 2014/0343775 A1 | 11/2014 | Yamamoto et al. | |

FOREIGN PATENT DOCUMENTS

JP 2014-223888 12/2014

* cited by examiner

*Primary Examiner* — Jacob S. Scott
*Assistant Examiner* — Lillian T Nguyen
(74) *Attorney, Agent, or Firm* — Oblon, McClelland, Maier & Neustadt, L.L.P.

(57) ABSTRACT

A control apparatus for a hybrid vehicle, having an engine, an electric motor, and an automatic transmission which is placed in a selected speed position with engagement of selected at least one of coupling devices, includes: an input torque control portion controlling the electric motor for controlling an input torque transmitted to the automatic transmission during a shifting action of the automatic transmission, based on output torque of the engine and torque transmitted through the coupling devices, such that a value representing a rotating state of an automatic transmission input rotary member coincides with a target value. The input torque control portion controls the input torque to be not smaller than a predetermined lower limit, when a running (Continued)

state of the hybrid vehicle is switched from a power-on state to a power-off state during a shift-down action of the automatic transmission in the power-on state.

12 Claims, 8 Drawing Sheets

(51) Int. Cl.
*B60W 20/10* (2016.01)
*B60K 6/365* (2007.10)
*B60W 10/115* (2012.01)
*B60K 6/445* (2007.10)
*B60W 10/06* (2006.01)
*B60W 10/08* (2006.01)
*B60W 10/105* (2012.01)

(52) U.S. Cl.
CPC .......... *B60W 10/08* (2013.01); *B60W 10/105* (2013.01); *B60W 10/115* (2013.01); *B60W 20/15* (2016.01); *B60W 30/19* (2013.01); *B60W 2510/0275* (2013.01); *B60W 2510/0657* (2013.01); *B60W 2510/1005* (2013.01); *B60W 2510/108* (2013.01); *B60W 2520/10* (2013.01); *B60W 2710/0666* (2013.01); *B60W 2710/083* (2013.01); *B60W 2710/1022* (2013.01); *B60Y 2200/92* (2013.01); *Y02T 10/6239* (2013.01); *Y02T 10/7258* (2013.01); *Y10S 903/93* (2013.01)

(58) Field of Classification Search
CPC ......... B60W 20/30; B60W 2510/0275; B60W 2510/0657; B60W 10/105; B60W 10/10; B60W 2510/1005; B60W 2510/108; B60W 2520/10; B60W 2710/0666; B60W 2710/083; B60W 2710/1022; B60K 6/365; B60K 6/445; Y02T 10/6239; Y02T 10/7258; B60Y 2200/92; Y10S 903/93

See application file for complete search history.

| AT GEAR POSITION | C1 | C2 | B1 | B2 | F1 |
|---|---|---|---|---|---|
| 1st | ○ | | | △ | ○ |
| 2nd | ○ | | ○ | | |
| 3rd | ○ | ○ | | | |
| 4th | | ○ | ○ | | |

| OVERALL SPEED POSITION | 1 | 2 | 3 | 4 | 5 | 6 | 7 | 8 | 9 | 10 |
|---|---|---|---|---|---|---|---|---|---|---|
| AT GEAR POSITION | 1 | 1 | 1 | 2 | 2 | 2 | 3 | 3 | 3 | 4 |

CONTROL APPARATUS FOR HYBRID VEHICLE

This application claims priority from Japanese Patent Application No. 2016-250223 filed on Dec. 23, 2016, the disclosure of which is herein incorporated by reference in its entirety.

FIELD OF THE INVENTION

The present invention relates to a control apparatus for a hybrid vehicle provided with an engine and an electric motor functioning as a drive power source, and an automatic transmission.

BACKGROUND OF THE INVENTION

There is known a hybrid vehicle provided with an engine and an electric motor functioning as a drive power source, and an automatic transmission which constitutes a part of a power transmitting path between the drive power source and drive wheels and which is placed in a selected one of a plurality of gear or speed positions with engagement of selected at least one of a plurality of coupling devices. A hybrid vehicle disclosed in JP-2014-223888A is an example of this type of hybrid vehicle. This document discloses a control apparatus configured to control the electric motor (second electric motor) for controlling an input torque transmitted to the automatic transmission during a shifting action of the automatic transmission, on the basis of an output torque of the engine and a torque transmitted through the coupling devices, such that an angular acceleration value of an input rotary member of the automatic transmission (angular acceleration value of the second electric motor) coincides with a target value.

By the way, upon switching of a running state of the hybrid vehicle from a power-on state to a power-off state, with an accelerator pedal being returned to its fully released or non-operated position during a shift-down action of the automatic transmission in the power-on state, a control apparatus for the hybrid vehicle implements a hydraulic control to lower an engaging hydraulic pressure of a releasing-side coupling device to be brought into its released state to perform the shift-down action of the automatic transmission. At this time, an input shaft of the automatic transmission receives a regenerative torque of the electric motor, as well as a friction torque of the engine, so that a large negative total torque is applied to the input shaft. This negative torque causes a drop of a rotating speed of the input shaft, and a reverse progress of the shift-down action, so that speed synchronization of the input shaft is delayed with respect to a rise of an engaging hydraulic pressure of an engaging-side coupling device to be brought into its engaged state to perform the shift-down action, whereby the engaging-side coupling device is abruptly brought into the engaged state prior to a moment of the speed synchronization, giving rise to a risk of generation of an engaging shock of the engaging-side coupling device.

SUMMARY OF THE INVENTION

The present invention was made in view of the background art described above. It is therefore an object of the present invention to provide a control apparatus for a hybrid vehicle, which permits reduction of a risk of the reverse progress of the shift-down action of the automatic transmission and the consequent generation of the engaging shock of the engaging-side coupling device, upon switching of the running state of the hybrid vehicle from the power-on state to the power-off state during the shift-down action in the power-on state.

The object indicated above is achieved according to the following modes of the present invention:

According to a first mode of the invention, there is provided a control apparatus for a hybrid vehicle provided with an engine and an electric motor which function as a drive power source, and an automatic transmission which constitutes a part of a power transmitting path between the drive power source and vehicle drive wheels and which is placed in a selected one of a plurality of speed positions with engagement of selected at least one of a plurality of coupling devices, said control apparatus comprising: an input torque control portion configured to control the electric motor for controlling an input torque transmitted to the automatic transmission during a shifting action of the automatic transmission, on the basis of an output torque of the engine and a torque transmitted through the coupling devices, such that a value representing a rotating state of an input rotary member of the automatic transmission coincides with a target value, and wherein the input torque control portion controls the input torque so as to be not smaller than a predetermined lower limit, when a running state of the hybrid vehicle is switched from a power-on state to a power-off state during a shift-down action of the automatic transmission in the power-on state.

According to a second mode of the invention, the control apparatus according to the first mode of the invention is configured such that the lower limit of the input torque is set at a value above which the automatic transmission is enabled to perform the shift-down action without a reverse progress.

According to a third mode of the invention, the control apparatus according to the second mode of the invention further comprises an input-torque lower-limit setting portion configured to set the lower limit of the input torque of the automatic transmission on the basis of at least one of a kind of the shift-down action of the automatic transmission, a running speed of the hybrid vehicle and a temperature of a working fluid for the automatic transmission.

According to a fourth mode of the invention, the control apparatus according to any one of the first through third modes of the invention is configured such that the input torque control portion implements a control to increase at least one of an output torque of the electric motor and the output torque of the engine, when the input torque is controlled so as to be not smaller than the lower limit of the input torque.

According to a fifth mode of the invention, the hybrid vehicle controlled by the control apparatus according to any one of the first through fourth modes of the invention is further provided with a differential mechanism having a first rotary element operatively connected to the engine in a power transmittable manner, a second rotary element operatively connected to a first electric motor in a power transmittable manner, and a third rotary element operatively connected to the input rotary member and a second electric motor in a power transmittable manner. The electric motor of the drive power source is the second electric motor operatively connected to the third rotary element.

According to the first mode of the invention, the control apparatus is configured such that the input torque of the automatic transmission is controlled so as to be not smaller than the lower limit, even where the running state of the hybrid vehicle is switched to the power-off state during the shift-down action of the automatic transmission in the power-on state. Accordingly, the shift-down action can be adequately implemented without a reverse progress. Thus, the present embodiment permits reduction of a risk of the reverse progress of the shift-down action of the automatic transmission upon switching to the power-off state and consequent generation of its shifting shock.

According to the second mode of the invention wherein the lower limit of the input torque of the automatic transmission is set at the value above which the shift-down action of the automatic transmission can be adequately implemented without its reverse progress, the input torque is controlled so as to be not smaller than the thus set lower limit even where the running state of the hybrid vehicle is switched to the power-off state, whereby the risk of the reverse progress of the shift-down action can be reduced.

According to the third mode of the invention, the lower limit of the input torque can be adequately set so as to reduce the risk of the reverse progress of the shift-down action of the automatic transmission, on the basis of at least one of the kind of the shift-down action of the automatic transmission, the running speed of the hybrid vehicle and the temperature of the working fluid.

According to the fourth mode of the invention, the input torque control portion implements the control to increase at least one of the output torque of the electric motor and the output torque of the engine, so that the input torque is controlled so as to be not smaller than the lower limit. Accordingly, the input torque can be adequately controlled so as to be not smaller than the lower limit, by increasing the output torque of the engine, even where the output torque of the electric motor is limited, for example.

According to the fifth mode of the invention, the hybrid vehicle to be controlled by the control apparatus is provided with the differential mechanism and the automatic transmission, and a directly transmitted torque of the engine and the torque of the second electric motor is transmitted to the automatic transmission as its input torque, so that the input torque of the automatic transmission can be controlled so as to be not smaller than the lower limit, by controlling the engine, the first electric motor and the second electric motor.

DETAILED DESCRIPTION OF PREFERRED EMBODIMENTS

Figure 1:
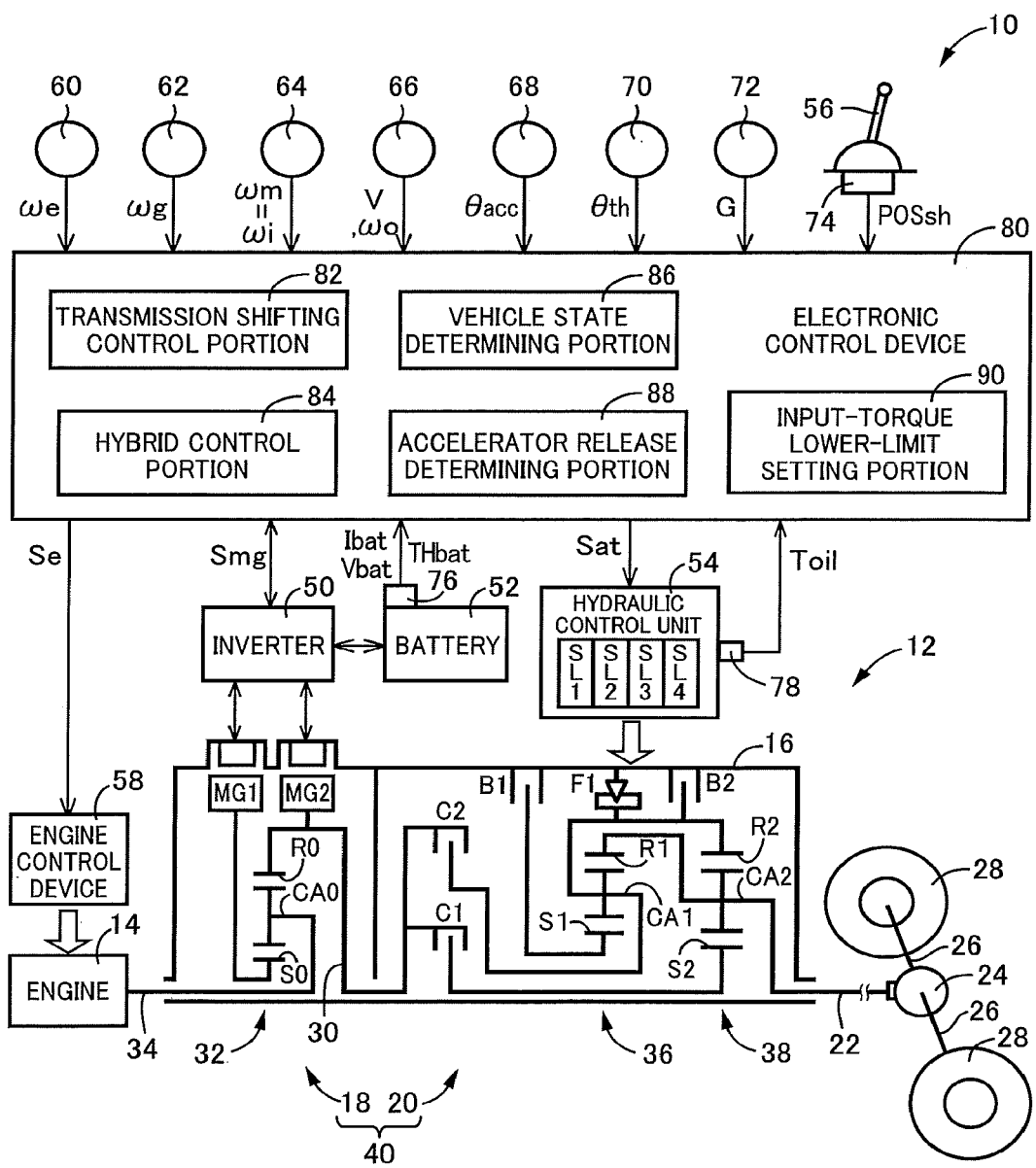
FIG. 1 is a schematic view showing an arrangement of a drive system of a vehicle to be controlled by a control apparatus according to the present invention, and major control functions and control portions of the control apparatus.

Referring to the drawings, preferred embodiments of the present invention will be described in detail. It is to be understood that the drawings are simplified and transformed as needed, and do not necessarily accurately represent the dimensions and shapes of various elements shown therein.
Embodiments Reference is first made to FIG. 1, which is the schematic view showing an arrangement of a drive system 12 of a vehicle 10 to be controlled by a control apparatus according to the present invention, and major portions of the control apparatus to perform various controls of the vehicle 10. As shown in FIG. 1, the vehicular drive system 12 is provided with an engine 14 functioning as a drive power source, an electrically controlled continuously variable transmission portion 18 (hereinafter referred to as "continuously variable transmission portion 18") connected directly or indirectly via a damper (not shown) or any other device to the engine 14, and a mechanically operated step-variable transmission portion 20 (hereinafter referred to as "step-variable transmission portion 20) connected to an output rotary member of the continuously variable transmission portion 18. The continuously variable transmission portion 18 and the step-variable transmission portion 20 are disposed in series with each other within a transmission casing 16 (hereinafter referred to as "casing 16") functioning as a stationary member fixed to a body of the vehicle 10, such that the transmission portions 18 and 20 are disposed coaxially with each other on a common axis. The vehicular drive system 12 is further provided with a differential gear mechanism 24 connected to an output rotary member of the step-variable transmission portion 20 in the form of an output shaft 22, and a pair of axles 26 connected to the differential gear mechanism 24. In the vehicular drive system 12, a drive force ("drive torque" or "drive power" unless otherwise distinguished from the drive force) of the engine 14 and a second electric motor MG2 (described below) is transmitted to the step-variable transmission portion 20, and is transmitted from the step-variable transmission portion 20 to drive wheels 28 of the vehicle 10 through the differential gear mechanism 24 and other devices. The vehicular drive system 12 is suitably used in the vehicle 10 of an FR type (front-engine rear-drive type) in which the axis of the engine 14 is parallel to the longitudinal direction of the vehicle 10. It is noted that the continuously variable transmission portion 18 and the step-variable transmission portion 20 are constructed substantially symmetrically with each other about the axis of the engine 14 (about the above-indicated common axis), and that FIG. 1 does not show the lower halves of the transmission portions 18 and 20.

The engine 14 is the drive power source to drive the vehicle 10, which is a known internal combustion engine such as a gasoline engine or a diesel engine. An engine torque Te which is an output torque of this engine 14 is controlled by an electronic control device 80 (described below) which controls the operating condition of the engine 14 as represented by an opening angle of a throttle valve or an intake air quantity, an amount of injection of a fuel and an ignition timing. In the present embodiment, the engine 14 is connected to the continuously variable transmission portion 18, without a fluid-operated type power transmitting device such as a torque converter or a fluid coupling being disposed between the engine 14 and the transmission portion 18.

The continuously variable transmission portion 18 is provided with: a first electric motor MG1; a differential mechanism 32 functioning as a power distributing device to mechanically distribute the drive force of the engine 14 to the first electric motor MG1, and to an intermediate power transmitting member 30 which is an output rotary member of the continuously variable transmission portion 18; and the second electric motor MG2 operatively connected to the intermediate power transmitting member 30. The continuously variable transmission portion 18 is an electrically controlled continuously variable transmission wherein a differential state of the differential mechanism 32 is controllable by controlling an operating state of the first electric motor MG1. The first electric motor MG1 functions as a differential motor/generator (a differential motor) while the second electric motor MG2 is an electric motor which functions as a drive power source, namely, a vehicle driving motor/generator. The vehicle 10 is a hybrid vehicle provided with the drive power source in the form of the engine 14 and the second electric motor MG2.

Each of the first electric motor MG1 and the second electric motor MG2 is an electrically operated rotary device having a function of an electric motor and a function of an electric generator. The first electric motor MG1 and the second electric motor MG2 are connected to an electric power storage device in the form of a battery 52 through an inverter 50. The inverter 50 provided on the vehicle 10 is controlled by the control apparatus in the form of the above-indicated electronic control device 80 described below in detail, to control an output torque (regenerative torque) of the first electric motor MG1, namely, an MG1 torque Tg, and an output torque (forward driving torque) of the second electric motor MG2, namely, an MG2 torque Tm. The battery 52 also provided on the vehicle 10 is the electric power storage device to and from which an electric power is supplied from and to the first electric motor MG1 and the second electric motor MG2. It is noted that the second electric motor MG2 corresponds to an electric motor of a hybrid vehicle to be controlled by the control apparatus of the present invention.

The differential mechanism 32 is a planetary gear set of a single-pinion type having a sun gear S0, a carrier CA0 and a ring gear R0. The carrier CA0 is operatively connected to the engine 14 through a connecting shaft 34 in a power transmittable manner, and the sun gear S0 is operatively connected to the first electric motor MG1 in a power transmittable manner, while the ring gear R0 is operatively connected to the second electric motor MG2 in a power transmittable manner. In the differential mechanism 32, the carrier CA0 functions as an input rotary element, and the sun gear S0 functions as a reaction rotary element, while the ring gear R0 functions as an output rotary element.

The step-variable transmission portion 20 is a step-variable transmission which constitutes a part of a power transmitting path between the intermediate power transmitting member 30 and the drive wheels 28. The intermediate power transmitting member 30 also functions as an input rotary member of the step-variable transmission portion 20. The step-variable transmission portion 20 is considered to also constitute a part of a power transmitting path between the second electric motor MG2 and the drive wheels 28, since the second electric motor MG2 is connected to the intermediate power transmitting member 30 such that the intermediate power transmitting member 30 is rotated together with the second electric motor MG2. The step-variable transmission portion 20 is a known automatic transmission of a planetary gear type which is provided with a plurality of planetary gear sets in the form of a first planetary gear set 36 and a second planetary gear set 38, and a plurality of coupling devices in the form of a clutch C1, a clutch C2, a brake B1 and a brake B2 (hereinafter referred to as "coupling devices CB" unless otherwise specified). It is noted that the step-variable transmission portion 20 corresponds to an automatic transmission of a hybrid vehicle to be controlled by the control apparatus of the present invention.

Each of the coupling devices CB is a hydraulically operated frictional coupling device in the form of a multiple-disc type or a single-disc type clutch or brake that is operatively pressed by a hydraulic actuator, or a band brake that is operatively tightened by a hydraulic actuator. The coupling devices CB are selectively placed in engaged, slipped or released states with their torque capacities (engaging torque values) Tcb being changed according to engaging hydraulic pressures PRcb applied thereto, which are regulated by respective solenoid-operated valves SL1-SL4 incorporated within a hydraulic control unit 54. In order for each coupling device CB to be able to transmit a torque (for example, an AT input shaft torque Ti which is an input torque of the step-variable transmission portion 20) between the intermediate power transmitting member 30 and the output shaft 22, without a slipping action (without a speed difference between input and output elements of the coupling device CB), the relevant coupling device CB should be given an engaging torque Tcb enough to permit transmission of a component of the input torque, which is assigned to be transmitted by the coupling device CB in question, that is, to permit transmission of an assigned torque (CB-transmitted torque) to be transmitted through the coupling device CB. However, it is noted that an increase of the engaging torque Tcb enough to obtain the CB-transmitted torque does not cause an increase of the CB-transmitted torque. That is, the engaging torque Tcb is equivalent to a maximum value of the torque that can be transmitted through the coupling device CB, and the CB-transmitted torque is equivalent to the torque that is actually transmitted through the coupling device CB. It is noted that the engaging torque (CB-transmitted torque) Tcb and the engaging hydraulic pressure PRcb are proportional to each other, before the engaging hydraulic pressure PRcb has been raised to initiate an engaging contact of the input and output elements with each other.

In the step-variable transmission portion 20, selected ones of rotary elements (sun gears S1 and S2, carriers CA1 and CA2, and ring gears R1 and R2) of the first and second planetary gear sets 36 and 38 are connected to each other or to the intermediate power transmitting member 30, casing 16 or output shaft 22, either directly or indirectly (selectively) through the coupling devices CB or a one-way clutch F1.

The step-variable transmission portion 20 is shifted to a selected one of four AT gear positions (speed positions) by engaging actions of selected ones of the coupling devices CB. These four AT gear positions have respective different speed ratios γat (=AT input speed ωi/AT output speed ωo). Namely, the step-variable transmission portion 20 is shifted up and down from one gear position to another by placing selected ones of the coupling devices CB in the engaged state. The AT input speed ωi is a rotating speed (angular velocity) of the input rotary member of the step-variable transmission portion 20, that is, a rotating speed of the intermediate power transmitting member 30, which is equal to an MG2 speed ωm which is an operating speed of the second electric motor MG2. Thus, the AT input speed ωi can be represented by the MG2 speed ωm. The AT output speed ωo is a rotating speed of the output shaft 22 of the step-variable transmission portion 20, which is considered to be an output speed of a transmission device 40 which consists of the continuously variable transmission portion 18 and the step-variable transmission portion 20.

Figures 2, 3:
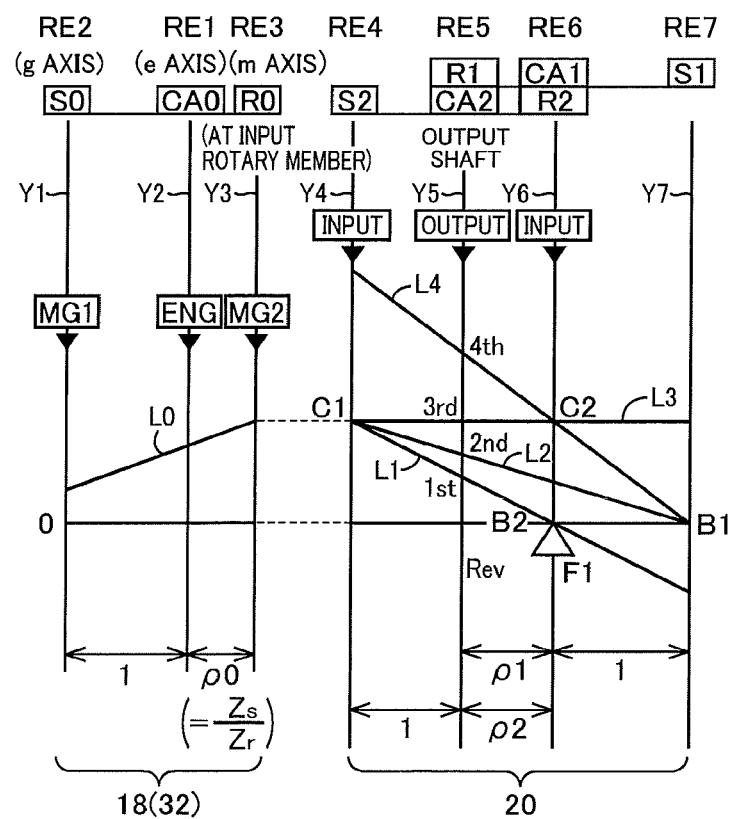
FIG. 2 is a table indicating a relationship between gear positions of a mechanically operated step-variable transmission portion shown in FIG. 1 and combinations of coupling devices placed in engaged states to establish the respective gear positions.
FIG. 3 is a collinear chart indicating a relationship among rotating speeds of rotary elements of an electrically controlled continuously variable transmission portion also shown in FIG. 1 and the mechanically operated step-variable transmission portion.

Reference is now made to FIG. 2, which is the table indicating the relationship between the first through fourth speed AT gear positions of the step-variable transmission portion 20 shown in FIG. 1 and combinations of the coupling devices CB placed in the engaged states to establish the respective AT gear positions. In the table, the four forward drive AT gear positions are respectively represented by "$1^{st}$", "$2^{nd}$", "$3^{rd}$" and "$4^{th}$". The first speed AT gear position "$1^{st}$" has a highest speed ratio γat, and the speed ratios γat of the four AT gear positions decrease in the direction from the first speed AT gear position (lowest-speed gear position) "$1^{st}$" toward the fourth speed AT gear position (highest-speed gear position) "$4^{th}$". In the table, "O" indicates the engaged state of the coupling devices CB, "Δ" indicates the engaged state of the coupling device B2 during application of an engine brake to the vehicle 10 or during a shift-down action of the step-variable transmission portion 20 while the vehicle 10 is in a coasting run, while the blank indicates the released state of the coupling devices CB. The one-way clutch F1 indicated above is disposed in parallel to the brake B2 which is placed in the engaged state to establish the first speed AT gear position "$1^{st}$", so that the brake B2 is not required to be placed in the engaged state upon starting or acceleration of the vehicle 10. The above-indicated shift-down action of the step-variable transmission portion 20 in the coasting run of the vehicle 10 is a kind of a "power-off shift-down action" which is required as a result of reduction of a vehicle-speed-related value (vehicle running speed V, for example) due to reduction of a required drive force (as represented by an operation amount θacc of an accelerator pedal) or during deceleration of the vehicle 10 in a released position of the accelerator pedal (with the operation amount θacc of the accelerator pedal being zero or substantially zero), and is a shift-down action which is required during deceleration of the vehicle 10 in the released position of the accelerator pedal. It is noted that the step-variable transmission portion 20 is placed in a neutral position (a power transmission cutoff state) when all of the coupling devices CB are placed in the released states.

The step-variable transmission portion 20 is shifted up or down to establish a newly selected one of the four AT gear positions, according to the operation amount θacc of the accelerator pedal and the vehicle running speed V, with a releasing action of one of the coupling devices CB and a concurrent engaging action of another coupling device CB, which concurrent releasing and engaging actions are controlled by the above-indicated electronic control device 80, more specifically, by a transmission shifting control portion 82 configured to control shifting actions of the step-variable transmission portion 20. The above-indicated one coupling device CB was placed in the engaged state before the step-variable transmission portion 20 is shifted to establish the newly selected AT gear position, while the above-indicated another coupling device CB is placed in the engaged state while the step-variable transmission portion 20 is placed in the newly selected AT gear position. Thus, the step-variable transmission portion 20 is shifted up or down from one of the AT gear positions to another by so-called "clutch-to-clutch" shifting operation, namely, concurrent releasing and engaging actions of the selected two coupling devices CB. For instance, the step-variable transmission portion 20 is shifted down from the second speed AT gear position "$2^{nd}$" to the first speed AT gear position "$1^{st}$", with the releasing action of the brake B1 and the concurrent engaging action of the brake B2, as indicated in the table of FIG. 2. In this instance, the hydraulic pressures applied to the brakes B1 and B2 are transiently controlled to bring these brakes B1 and B2 into the released and engaged states, respectively.

The collinear chart of FIG. 3 indicates a relationship among rotating speeds of the rotary elements of the continuously variable transmission portion 18 and the step-variable transmission portion 20. In this collinear chart, three vertical lines Y1, Y2 and Y3 corresponding to the respective three rotary elements of the differential mechanism 32 of the continuously variable transmission portion 18 respectively represent a "g" axis representing the rotating speed of the second rotary element RE2 in the form of the sun gear S0, an "e" axis representing the rotating speed of the first rotary element RE1 in the form of the carrier CA0, and an "m" axis representing the rotating speed of the third rotary element RE3 in the form of the ring gear R0 (i.e., the input rotating speed of the step-variable transmission portion 20). Further, four vertical lines Y4, Y5, Y6 and Y7 corresponding to the respective four rotary elements of the step-variable transmission portion 20 respectively represent an axis representing the rotating speed of the fourth rotary element RE4 in the form of the sun gear S2, an axis representing the rotating speed of the fifth rotary element RE5 in the form of the ring gear R1 and the carrier CA2 fixed to each other, namely, the rotating speed of the output shaft 22, an axis representing the rotating speed of the sixth rotary element RE6 in the form of the carrier CA1 and the ring gear R2 fixed to each other, and an axis representing the rotating speed of the seventh rotary element RE7 in the form of the sun gear S1. The distances between the adjacent ones of the vertical lines Y1, Y2 and Y3 are determined by a gear ratio ρ0 of the differential mechanism 32, while the distances between the adjacent ones of the vertical lines Y4-Y7 are determined by gear ratios ρ1 and ρ2 of the respective first and second planetary gear sets 36 and 38. Where the distance between the axis representing the rotating speed of the sun gear S0, S1, S2 and the axis representing the rotating speed of the carrier CA0, CA1, CA2 corresponds to "1", the distance between the axis representing the rotating speed of the carrier CA0, CA1, CA2 and the axis representing the rotating speed of the ring gear R0, R1, R2 corresponds to the gear ratio ρ of the planetary gear set number of teeth Zs of the sun gear/number of teeth Zr of the ring gear).

Referring to the collinear chart of FIG. 3, the differential mechanism 32 of the continuously variable transmission portion 18 is arranged such that the engine 14 (represented as "ENG" in the collinear chart) is connected to the first rotary element RE1, and the first electric motor MG1 (represented as "MG1" in the collinear chart) is connected to the second rotary element RE2, while the second electric motor MG2 (represented as "MG2" in the collinear chart) is connected to the third rotary element RE3 which is rotated together with the intermediate power transmitting member 30. Thus, a rotary motion of the engine 14 is transmitted to the step-variable transmission portion 20 through the intermediate power transmitting member 30. In a part of the collinear chart corresponding to the continuously variable transmission portion 18, a straight line L0 intersecting the vertical line Y2 represents a relationship between the rotating speeds of the sun gear S0 and the ring gear R0.

The step-variable transmission portion 20 is arranged such that the fourth rotary element RE4 is selectively connected to the intermediate power transmitting member 30 through the clutch C1, the fifth rotary element RE5 is connected to the output shaft 22, the sixth rotary element RE6 is selectively connected to the intermediate power transmitting member 30 through the clutch C2 and is selectively connected to the casing 16 through the brake B2, and the seventh rotary element RE7 is selectively connected to the casing 16 through the brake B1. In a part of the collinear chart corresponding to the step-variable transmission portion 20, straight lines L1, L2, L3 and L4 intersecting the vertical line Y5 represent the rotating speeds of the output shaft 22 in the respective first, second, third and fourth speed AT gear positions "$1^{st}$", "$2^{nd}$", "$3^{rd}$" and "$4^{th}$" that are selectively established with selective engaging and releasing actions of the coupling devices CB.

Solid straight lines L0, L1, L2, L3 and L4 shown in the collinear chart of FIG. 3 indicate the relative rotating speeds of the rotary elements in a hybrid drive mode in which the vehicle 10 is driven in the forward direction with at least the engine 14 being operated as a drive power source. In the differential mechanism 32 and in this hybrid drive mode, when a torque Te of the engine 14 (engine torque Te) is applied to the carrier CA0 while a reaction torque which is a negative torque generated by the first electric motor MG1 operated in the positive direction is applied to the sun gear S0, a directly transmitted engine torque Td ($=Te/(1+\rho)=-(1/\rho)*T_g$) which is a positive torque is applied to the ring gear R0, and rotates the ring gear R0 in the positive direction. The vehicle 10 is driven in the forward direction with a vehicle drive torque which is a sum of the directly transmitted engine torque Td and the MG2 torque Tm and which is transmitted to the drive wheels 28 through the step-variable transmission portion 20 selectively placed in one of the first through fourth speed AT gear positions according to a required vehicle drive force. At this time, the first electric motor MG1 functions as an electric generator operated in the positive direction and generates a negative torque. An electric power Wg generated by the first electric motor MG1 is stored in the battery 52 or consumed by the second electric motor MG2. The second electric motor MG2 is operated to generate the MG2 torque Tm, with all or a part of the electric power Wg generated by the first electric motor MG1, or a sum of the generated electric power Wg and the electric power supplied from the battery 52.

In the differential mechanism 32 and in a motor drive mode in which the vehicle 10 is driven with a drive force generated by the second electric motor MG2 operated as a drive power source while the engine 14 is held at rest, the carrier CA0 is held stationary while the MG2 torque Tm which is a positive torque is applied to the ring gear R0 and rotates the ring gear R0 in the positive direction. The state of the differential mechanism in this motor drive mode is not shown in the collinear chart of FIG. 3. At this time, the first electric motor MG1 connected to the sun gear S0 is placed in a non-load state and freely operated in the negative direction. Namely, in the motor drive mode, the engine 14 is held in a non-operated state, so that an operating speed we of the engine 14 (engine speed we) is kept zero, and the vehicle 10 is driven in the forward direction with the MG2 torque Tm (positive forward driving torque), which is transmitted as a forward drive torque to the drive wheels 28 through the step-variable transmission portion 20 placed in one of the first through fourth speed AT gear positions. When the vehicle 10 is driven in the rearward direction, in the motor drive mode, for example, the MG2 torque Tm which is a negative torque is applied to the ring gear R0 and rotates the ring gear R0 in the negative direction, and is transmitted as the rear drive torque of the vehicle 10 to the drive wheels 28 through the step-variable transmission portion 20 placed in the first speed AT gear position.

In the vehicular drive system 12, the continuously variable transmission portion 18 functions as an electrically controlled shifting mechanism (electrically controlled differential mechanism) provided with the differential mechanism 32 the differential state of which is controlled by controlling the operating state of the first electric motor MG1, and which has the three rotary elements, that is, the first rotary element RE1 in the form of the carrier CA0 to which the engine 14 is operatively connected in a power transmittable manner, the second rotary element RE2 in the form of the sun gear S0 to which the first electric motor MG1 is operatively connected in a power transmittable manner, and the third rotary element RE3 in the form of the ring gear R0 to which the intermediate power transmitting member 30 is connected in a power transmittable manner (in other words, to which the second electric motor MG2 is operatively connected in a power transmittable manner). Namely, the continuously variable transmission portion 18 has the differential mechanism 32 to which the engine 14 is operatively connected in a power transmittable manner, and the first electric motor MG1 to which the differential mechanism 32 is operatively connected in a power transmittable manner, and the operating state of which is controlled to control the differential state of the differential mechanism 32. The continuously variable transmission portion 18 is operated as an electrically controlled continuously variable transmission a speed ratio γ0 ($=\omega e/\omega m$) of which is variable. The speed ratio is a ratio of a rotating speed of the connecting shaft 34 (namely, engine speed ωe) to the rotating speed of the intermediate power transmitting member 30 (namely, MG2 speed ωm).

In the hybrid drive mode, for instance, the rotating speed of the sun gear S0 is raised or lowered by controlling an operating speed of the first electric motor MG1 while the rotating speed of the ring gear R0 is determined by the rotating speed of the drive wheels 28 with the step-variable transmission portion 20 placed in one of the AT gear positions, so that the rotating speed of the carrier CA0 (namely, engine speed ωe) is accordingly raised or lowered.

During running of the vehicle 10 with an operation of the engine 14, therefore, the engine 14 can be operated at an efficient operating point. That is, the step-variable transmission portion 20 to be placed in a selected one of the AT gear positions and the continuously variable transmission portion 18 functioning as a continuously variable transmission cooperate to provide the transmission device 40 in which the continuously variable transmission portion 18 (differential mechanism 32) and the step-variable transmission portion 20 are disposed in series with each other and which functions as a continuously variable transmission as a whole.

Alternatively, the continuously variable transmission portion 18 can be shifted like a step-variable transmission. Accordingly, the transmission device 40 constituted by the step-variable transmission portion 20 to be placed in one of the AT gear positions and the continuously variable transmission portion 18 which can be shifted like the step-variable transmission can be shifted like a step-variable transmission as a whole. That is, the step-variable transmission portion 20 and the continuously variable transmission portion 18 can be controlled to selectively establish a plurality of speed positions (hereinafter referred to as "overall speed positions" or "conceptual speed positions") having respective different values of a speed ratio $\gamma t$ ($=\omega e/\omega o$) which is a ratio of the engine speed $\omega e$ to the output speed $\omega o$. The speed ratio $\gamma t$ is an overall speed ratio of the transmission device 40 consisting of the continuously variable transmission portion 18 and the step-variable transmission portion 20 which are disposed in series with each other. The overall speed ratio $\gamma t$ is equal to a product of the speed ratio $\gamma 0$ of the continuously variable transmission portion 18 and the speed ratio $\gamma at$ of the step-variable transmission portion 20, namely, $\gamma t=\gamma 0*\gamma at$.

Figures 4, 5:
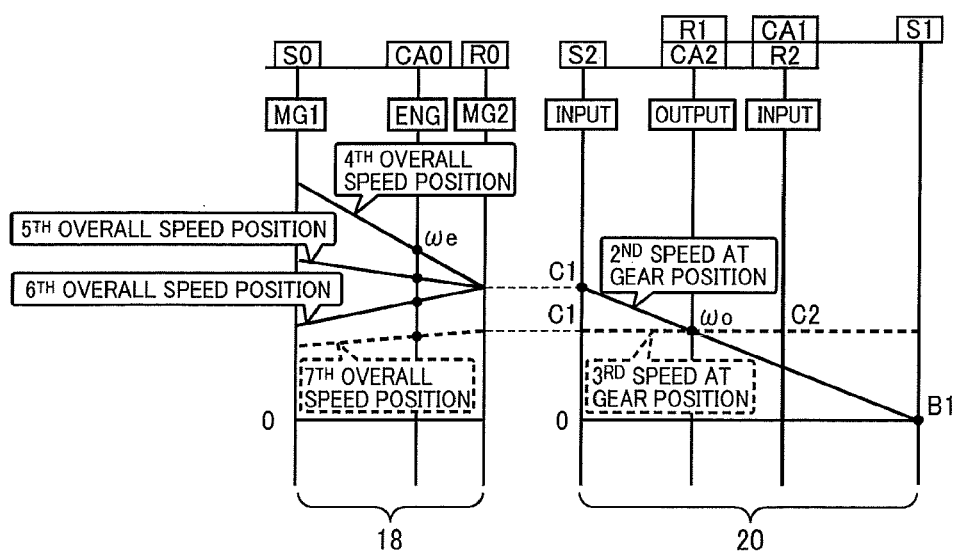
FIG. 4 is a table indicating an example of a plurality of overall speed positions of a transmission device in relation to the gear positions of the step-variable transmission portion.
FIG. 5 is a view indicating some examples of the gear positions of the step-variable transmission portion and some examples of the overall speed positions of the transmission device, on a collinear chart similar to that of FIG. 3.

At least one overall speed position is provided for each of the four AT gear positions of the step-variable transmission portion 20, with a combination of each AT gear position with at least one of the different speed ratio values $\gamma 0$ of the continuously variable transmission portion 18. FIG. 4 is the table indicating an example of the overall speed positions of the transmission device 40, wherein the first through third overall speed positions are established for the first speed AT gear position, the fourth through sixth overall speed positions are established for the second speed AT gear position, the seventh through ninth overall speed positions are established for the third speed AT gear position, and the tenth overall speed position is established for the fourth speed AT gear position.

FIG. 5 is the view indicating some examples of the AT gear positions of the step-variable transmission portion 20 and some examples of the overall speed positions of the transmission device 40, on a collinear chart similar to that of FIG. 3. In FIG. 5, solid lines indicate the fourth through sixth overall speed positions established when the step-variable transmission portion 20 is placed in the second speed AT gear position. In the transmission device 40, the continuously variable transmission portion 18 is controlled to control the engine speed we with respect to the output speed $\omega o$ for establishing the predetermined overall speed ratio values $\gamma t$, to thereby establish the different overall speed position or positions for each of the AT gear positions. A broken line indicates the seventh overall speed position established when the step-variable transmission portion 20 is placed in the third speed AT gear position. In the transmission device 40, the continuously variable transmission portion 18 is controlled according to the selected one of the AT gear positions, for shifting the transmission device 40 from one of the overall speed positions to another.

Referring back to FIG. 1, the vehicle 10 is provided with the control apparatus in the form of the electronic control device 80 configured to control various devices of the vehicle 10 such as the engine 14, continuously variable transmission portion 18 and step-variable transmission portion 20. FIG. 1 is the view showing input and output signals of the electronic control device 80, and is a functional block diagram showing major control functions and control portions of the electronic control device 80. For example, the electronic control device 80 includes a so-called microcomputer incorporating a CPU, a ROM, a RAM and an input-output interface. The CPU performs control operations of the vehicle 10, by processing various input signals, according to control programs stored in the ROM, while utilizing a temporary data storage function of the RAM. The electronic control device 80 may be constituted by two or more control units exclusively assigned to perform different control operations such as engine control operations and transmission shifting control operations.

The electronic control device 80 receives various input signals such as: an output signal of an engine speed sensor 60 indicative of the engine speed $\omega e$; an output signal of an MG1 speed sensor 62 indicative of the MG1 speed $\omega g$ which is the operating speed of the first electric motor MG1; an output signal of an MG2 speed sensor 64 indicative of the MG2 speed $\omega m$ which is the AT input speed $\omega i$; an output signal of an output speed sensor 66 indicative of the output speed $\omega o$ corresponding to the vehicle running speed V; an output signal of an accelerator pedal operation amount sensor 68 indicative of the operation amount $\theta acc$ of the accelerator pedal, which operation amount $\theta acc$ represents a degree of acceleration of the vehicle 10 required by a vehicle operator; an output signal of a throttle valve opening angle sensor 70 indicative of an angle $\theta th$ of opening of an electronic throttle valve; an output signal of an acceleration sensor 72 indicative of a longitudinal acceleration value G of the vehicle 10; an output signal of a shift position sensor 74 indicative of an operating position POSsh of a manually operated shifting member in the form of a shift lever 56 provided in the vehicle 10; output signals of a battery sensor 76 indicative of a temperature THbat, a charging/discharging electric current Ibat and a voltage Vbat of the battery 52; and an output signal of an oil temperature sensor 78 indicative of a temperature THoil of a working fluid in the step-variable transmission portion 20.

Further, the electronic control device 80 generates various output signals such as: an engine control command signal Se to be applied to an engine control device 58 provided to control a throttle actuator, a fuel injecting device and an ignition device, for controlling the engine 14; electric motor control command signals Smg to be applied to the inverter 50, for controlling the first electric motor MG1 and the second electric motor MG2; and hydraulic control command signals Sat to be applied to the hydraulic control unit 54, for controlling the operating states of the coupling devices CB (namely, for controlling the shifting actions of the step-variable transmission portion 20). The hydraulic control command signals Sat are command signals (drive currents) to be applied to the hydraulic control unit 54 for controlling amounts of electric currents to be applied to the solenoid-operated valves SL1-SL4 which regulate the engaging hydraulic pressure PRcb to be applied to each of the hydraulic actuators of the coupling devices CB. The electronic control device 80 operates to set a hydraulic pressure command value (command pressure) corresponding to the engaging hydraulic pressure PRcb to be applied to each of the hydraulic actuators, for establishing a target value of the engaging torque Tcb of the corresponding coupling device CB, and outputs a drive current corresponding to the hydraulic pressure command value.

The electronic control device 80 is configured to calculate a charging state (stored electric power amount) SOC of the battery 52 on the basis of the charging/discharging electric current Ibat and the voltage Vbat of the battery 52. The electronic control device 80 is further configured to calculate, on the basis of, for example, the temperature THbat and the charging state SOC of the battery 52, a maximum charging amount Win of electric power that can be stored in the battery 52, and a maximum discharging amount Wout of electric power that can be discharged from the battery 52, which maximum charging and discharging amounts Win and Wout define a range of an electric power Pbat of the battery 52 that can be used. The calculated maximum charging and discharging amounts Win and Wout decrease with a decrease of the battery temperature THbat when the battery temperature THbat is lower than a normal level, and decrease with an increase of the battery temperature THbat when the battery temperature THbat is higher than the normal level. Further, the maximum charging amount Win decreases with an increase of the stored electric power amount SOC when the stored electric power amount SOC is relatively large. The maximum discharging amount Wout decreases with a decrease of the stored electric power amount SOC when the stored electric power amount SOC is relatively small.

The electronic control device 80 includes a shift control means or portion in the form of a transmission shifting control portion 82, and a hybrid control means or portion in the form of a hybrid control portion 84, for performing various controls of the vehicle 10. It is noted that the hybrid control portion 84 corresponds to an input torque control portion of the control apparatus according to the present invention.

The transmission shifting control portion 82 is configured to determine a shifting action of the step-variable transmission portion 20 according to a memory-stored AT gear position shifting map obtained by experimentation or determined by an appropriate design theory, and applies the hydraulic control command signals Sat to the hydraulic control unit 54, for commanding the solenoid-operated valves SL1-SL4 to bring the appropriate ones of the coupling devices CB into the released and engaged states, for automatically shifting up or down the step-variable transmission portion 20. The AT gear position shifting map indicated above is a predetermined relationship between two variables in the form of the output speed $\omega o$ (equivalent to the vehicle running speed V) and the accelerator pedal operation amount $\theta acc$ (equivalent to a required drive torque Tdem and the throttle valve opening angle $\theta th$), which relationship is used to determine a shifting action of the step-variable transmission portion 20 and is represented by shift-up and shift-down shifting lines in a two-dimensional coordinate system in which the output speed $\omega o$ and the accelerator pedal operation amount $\theta acc$ are taken along respective two axes.

The hybrid control portion 84 has a function of an engine control means or portion to control the engine 14, and a function of an electric motor control means or portion to control the first electric motor MG1 and the second electric motor MG2 through the inverter 50. Thus, the hybrid control portion 84 performs hybrid drive controls for controlling the engine 14, first electric motor MG1 and second electric motor MG2. The hybrid control portion 84 is configured to calculate a required vehicle drive power Pdem on the basis of the accelerator pedal operation amount $\theta acc$ and the vehicle running speed V, and according to a predetermined relationship in the form of a drive force map, for instance. In other words, the hybrid control portion 84 calculates the drive torque Tdem at the present vehicle running speed V. The hybrid control portion 84 generates the engine control command signal Se to control the engine 14, and the electric motor control command signals Smg to control the first electric motor MG1 and the second electric motor MG2, for establishing the required vehicle drive power Pdem, while taking account of the maximum charging and discharging amounts Win and Wout of electric power of the battery 52. For example, the engine control command signal Se represents a command value of an engine power Pe which is a power of the engine 14 outputting the torque Te at its present operating speed $\omega e$. For example, the electric motor control command signals Smg represent a command value of an electric power amount Wg to be generated by the first electric motor MG1 to generate the reaction torque acting against the engine torque Te, namely, the MG1 torque Tg at the present MG1 speed $\omega g$, and an electric power amount Wm to be consumed by the second electric motor MG2 to generate the MG2 torque Tm at the present MG2 speed $\omega m$.

When the transmission device 40 as a whole is operated as the continuously variable transmission while the continuously variable transmission portion 18 is operated as the continuously variable transmission, for instance, the hybrid control portion 84 controls the engine 14 and the electric power amount Wg to be generated by the first electric motor MG1, so as to establish the engine speed $\omega e$ and the engine torque Te for obtaining the engine power Pe to establish the required vehicle drive power Pdem, while taking account of a highest fuel economy point of the engine 14, so that the speed ratio $\gamma 0$ of the continuously variable transmission portion 18 is controlled so as to be continuously varied. As a result, the speed ratio $\gamma t$ of the transmission device 40 is controlled while the continuously variable transmission portion 18 is operated as the continuously variable transmission.

When the transmission device 40 as a whole is operated as the step-variable transmission while the continuously variable transmission portion 18 is operated as the step-variable transmission, for instance, the hybrid control portion 84 determines a shifting action of the transmission device 40 according to an overall speed position shifting map, for example, and performs a shifting control of the continuously variable transmission portion 18 to establish a selected one of the plurality of overall speed positions, in cooperation with the transmission shifting control portion 82 to shift the step-variable transmission portion 20 selectively to the AT gear positions. The plurality of overall speed positions can be established by controlling the first electric motor MG1 to control the engine speed $\omega e$ according to the output speed $\omega o$ so as to maintain the respective speed ratio values $\gamma t$. It is noted that the speed ratio $\gamma t$ in each of the overall speed positions does not necessarily have to be constant over all ranges of the output speed $\omega o$, but may be changed in a certain range or ranges of the output speed $\omega o$ or may be given a limitation or limitations, for example, depending on upper and lower limits of rotating speeds of respective rotatable elements.

Figure 6:
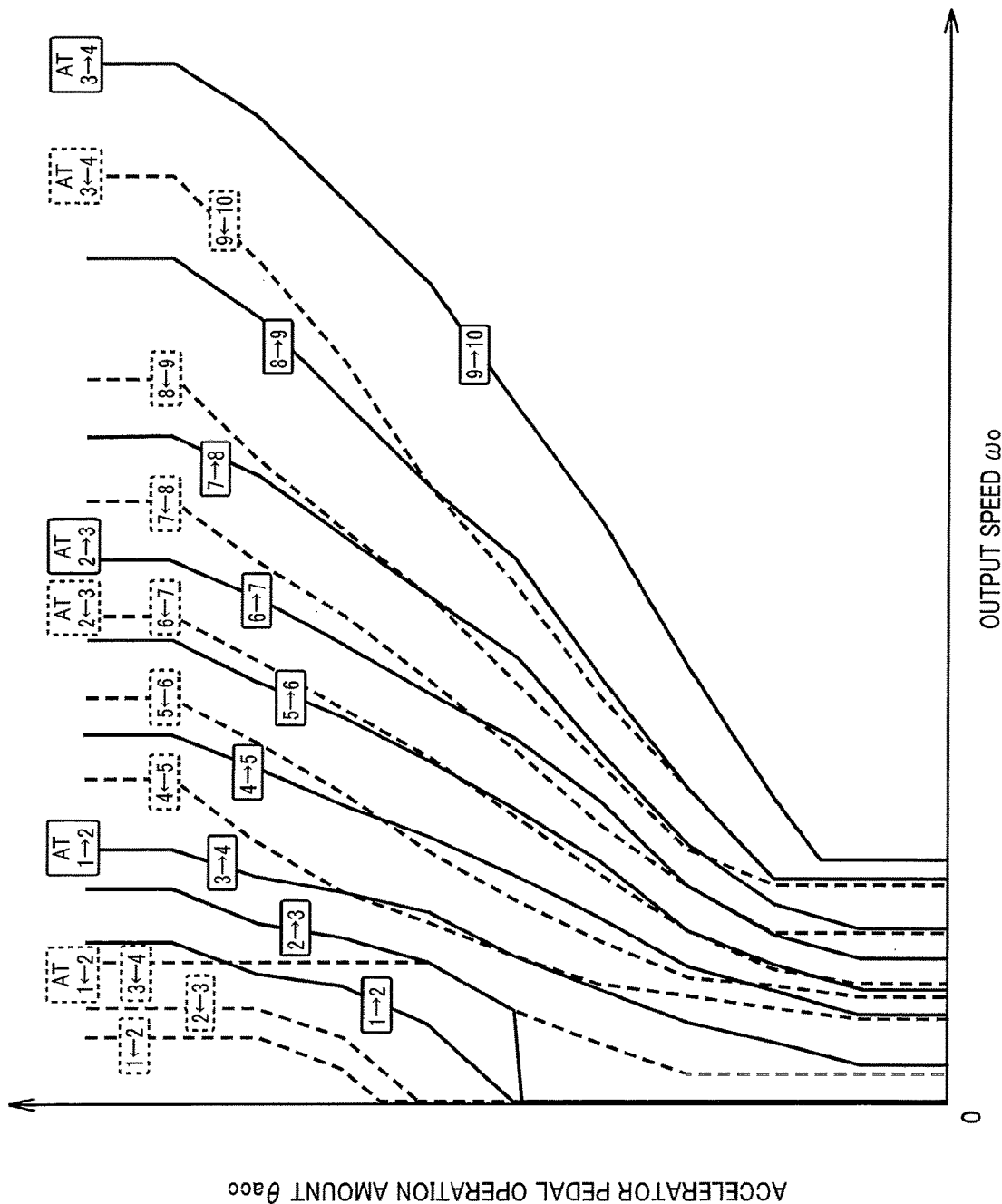
FIG. 6 is a view illustrating an example of an overall speed position shifting map used to shift up and down the transmission device from each of the overall speed positions to the adjacent position or positions.

Like the AT gear position shifting map, the above-indicated overall speed position shifting map is a relationship between the output speed $\omega o$ and the accelerator pedal operation amount $\theta acc$, which are used as control parameters. FIG. 6 is the view illustrating an example of the overall speed position shifting map. In FIG. 6, solid lines indicate shift-up boundary lines while broken lines indicate shift-down boundary lines. The transmission device 40 consisting of the continuously variable transmission portion 18 and the step-variable transmission portion 20 which are disposed in series with each other is shifted from one of the overall speed positions to another according to the overall speed position shifting map, as if the transmission device 40 was shifted like a step-variable transmission as a whole. This overall step-variable shifting control to control the shifting actions of the transmission device 40 as the step-variable transmission as a whole may be implemented preferentially to the continuously variable shifting control of the transmission device 40 as the continuously variable transmission as a whole, only when a sporty drive mode or any other high-drivability drive mode is selected by the vehicle operator, or only when the required drive torque Tdem is comparatively large, but may be principally implemented except where the overall step-variable shifting control is restricted or inhibited.

The overall step-variable shifting control by the hybrid control portion 84 and the shifting control of the step-variable transmission portion 20 by the transmission shifting control portion 82 are implemented in cooperation with each other. In this embodiment, the first through tenth overall speed positions are established for the first through fourth speed AT gear positions. When the transmission device 40 is shifted between the fourth overall speed position and the third overall speed position, for example, the step-variable transmission portion 20 is shifted between the second speed AT gear position and the first speed AT gear position. When the transmission device 40 is shifted between the seventh overall speed position and the sixth overall speed position, the step-variable transmission portion 20 is shifted between the third speed AT gear position and the second speed AT gear position. When the transmission device 40 is shifted between the tenth overall speed position and the ninth overall speed position, the step-variable transmission portion 20 is shifted between the fourth speed AT gear position and the third speed AT gear position. Therefore, the AT gear position shifting map is formulated so that the AT gear position shifting operation is performed in synchronization with the overall speed position shifting operation. Described more specifically by reference to FIG. 6, shift-up boundary lines for respectively shifting the transmission device 40 from the third overall speed position to the fourth overall speed position, from the sixth overall speed position to the seventh overall speed position, and from the ninth overall speed position to the tenth overall speed position coincide with shift-up boundary lines for respectively shifting the step-variable transmission portion 20 from the first speed AT gear position to the second speed AT gear position (indicated as "AT1→2" in FIG. 6), from the second speed AT gear position to the third speed AT gear position, and from the third speed AT gear position to the fourth speed AT gear position. Similarly, shift-down boundary lines for respectively shifting the transmission device 40 from the fourth overall speed position to the third overall speed position, from the seventh overall speed position to the sixth overall speed position, and from the tenth overall speed position to the ninth overall speed position coincide with shift-down boundary lines for respectively shifting the step-variable transmission portion 20 from the second speed AT gear position to the first speed AT gear position (indicated as "AT1←2" in FIG. 6), from the third speed AT gear position to the second speed AT gear position, and from the fourth speed AT gear position to the third speed AT gear position. Alternatively, a command to shift the step-variable transmission portion 20 may be applied to the transmission shifting control portion 82 in response to a determination according to the overall speed position shifting map of FIG. 6 that the transmission device 40 should be shifted from one overall speed position to another. Thus, a shift-up action of the transmission device 40 as a whole takes place upon a shift-up action of the step-variable transmission portion 20, and a shift-down action of the transmission device 40 as a whole takes place upon a shift-down action of the step-variable transmission portion 20. The transmission shifting control portion 82 commands the step-variable transmission portion 20 to perform a shifting action from one AT gear position to another, for shifting the transmission device 40 from one overall speed position to another. Since the AT gear position shifting operation is performed in synchronization with the overall speed position shifting operation, the shifting action of the step-variable transmission portion 20 is performed with a change of the engine speed ωe, so that the vehicle operator is less likely to uncomfortably recognize a shifting shock of the step-variable transmission portion 20.

The hybrid control portion 84 selectively establishes the motor drive mode or the hybrid drive mode, depending upon a running state of the vehicle 10. For example, the hybrid control portion 84 selects the motor drive mode when the required vehicle drive power Pdem is lower than a predetermined threshold value, that is, within a predetermined motor drive mode range, and selects the hybrid drive mode when the required vehicle drive power Pdem is equal to or higher than the threshold value, that is, within a predetermined hybrid drive mode range. Further, even when the required vehicle drive power Pdem is within the motor drive mode range, the hybrid control portion 84 selects the hybrid drive mode if the electric power amount SOC stored in the battery 52 is smaller than a predetermined threshold value.

Then, the overall step-variable shifting control of the transmission device 40 involving a shifting action of the step-variable transmission portion 20 will be described in detail. The hybrid control portion 84 implements a basic shifting control to control the MG1 torque Tg and the MG2 torque Tm during a shifting action of the step-variable transmission portion 20 under the control of the transmission shifting control portion 82 (more specifically, in the process of engaging and releasing actions of the relevant two coupling devices CB in an inertia phase of the shifting action), on the basis of the engine torque Te and the CB-transmitted torque Tcb of one of the two coupling devices CB to be respectively brought into its engaged and released states to permit the step-variable transmission portion 20 to perform the shifting action wherein the above-indicated one coupling device CB is an initiative coupling device, which causes the shifting action to progress, and CB-transmitted torque Tcb of which is controlled to progressively implement the shifting action, and such that an MG2 angular acceleration value dωm/dt of the second electric motor MG2 representing the rotating state of the input rotary member of the step-variable transmission portion 20, and an engine angular acceleration value dωe/dt of the engine 14 representing the operating state of the engine 14 coincide with respective predetermined target values. By controlling the MG1 torque Tg and the MG2 torque Tm, the input torque Ti of the step-variable transmission portion 20 can be controlled since a sum of the MG2 torque Tm and the directly transmitted engine torque Td applied to the ring gear R0 due to the reaction torque by the MG1 torque Tg that counteracts the engine torque Te is equal to the input torque Ti of the step-variable transmission portion 20.

The shifting control of the step-variable transmission portion 20 is performed in various shifting modes such as a power-on shift-up mode, a power-off shift-up mode, a power-on shift-down mode and a power-off shift-down mode. For instance, the shifting controls in the power-on shifting modes are implemented when the accelerator pedal operation amount θacc is increased or when the vehicle running speed V is raised while the accelerator pedal is kept in an operated position, and the shifting controls in the power-off shifting modes are implemented when the accelerator pedal operation amount θacc is reduced or when the vehicle running speed V is lowered while the accelerator pedal is kept in its non-operated or fully released position. If none of the two coupling devices to be respectively brought into the released and engaged states is given the CB-transmitted torque Tcb, the AT input speed ωi is naturally raised to a predetermined optimum value in the power-on shifting modes, and is naturally lowered to a predetermined optimum value in the power-off shifting modes. Accordingly, the shifting action is preferably initiated by increasing the CB-transmitted torque Tcb of the coupling device CB which is to be brought into the engaged state for the shifting action, in the power-on shift-up and power-off shift-down modes in which the AT input speed ωi is not naturally changed to a predetermined synchronizing speed ωisyca (=ωo*speed ratio γata to be established after completion of the shifting action) if none of the two coupling devices to be respectively brought into the released and engaged states is given the CB-transmitted torque Tcb. On the other hand, the shifting action is preferably initiated by reducing the CB-transmitted torque Tcb of the coupling device CB which has been placed in the engaged state before the shifting action and which is to be brought into the released state for the shifting action, in the power-off shift-up and power-on shift-down modes in which the AT input speed ωi is naturally changed to the predetermined synchronizing speed ωisyca even if none of the two coupling devices to be respectively brought into the released and engaged states is given the CB-transmitted torque Tcb. Thus, the coupling device CB to be brought into the engaged state in the power-on shift-up and power-off shift-down modes is the initiative coupling device the CB-transmitted torque Tcb of which is controlled to progressively implement the shifting action, while the coupling device CB to be brought into the released state in the power-off shift-up and power-on shift-down modes is the initiative coupling device the CB-transmitted torque Tcb of which is controlled to progressively implement the shifting action.

Described more specifically, the hybrid control portion 84 is configured to calculate the MG1 torque Tg and the MG2 torque Tm according to the following mathematical equation (1), and on the basis of the target values of the MG2 angular acceleration value dωm/dt and the engine angular acceleration value dωe/dt, the engine torque Te, and an AT-transmitted torque Tat. The hybrid control portion 84 is configured to apply the electric motor control command signals Sing to the inverter 50, so as to obtain the calculated MG1 torque Tg and MG2 torque Tm. For example, the mathematical equation (1) is derived from kinetic equations and a relationship equation. Each of the kinetic equations is established for a corresponding one of the "g", "e" and "m" axes of the continuously variable transmission portion 18 (indicated in FIG. 3), and is represented by an inertia value, an angular acceleration value and a torque value on the corresponding axis. The relationship equation is formulated in view of the continuously variable transmission portion 18 which has two degrees of freedom, (namely, in view of a fact that if the rotating speeds taken along two of the above-indicated three axes are determined, the rotating speed taken along the other axis is determined). Accordingly, values a11, b11, . . . , c22 in 2*2 matrices in the mathematical equation (1) represent combinations of parameters such as the inertia values of the rotary members of the continuously variable transmission portion 18, and the gear ratio ρ0 of the differential mechanism 32.

Mathematical Equation (1)

$$\begin{bmatrix} a_{11} & a_{12} \\ a_{21} & a_{22} \end{bmatrix} \begin{bmatrix} \dot{\omega}_m \\ \dot{\omega}_e \end{bmatrix} = \begin{bmatrix} b_{11} & b_{12} \\ b_{21} & b_{22} \end{bmatrix} \begin{bmatrix} T_m \\ T_g \end{bmatrix} + \begin{bmatrix} c_{11} & c_{12} \\ c_{21} & c_{22} \end{bmatrix} \begin{bmatrix} T_e \\ T_{at} \end{bmatrix} \qquad (1)$$

For example, the target values of the MG2 angular acceleration value dωm/dt and the engine angular acceleration value dωe/dt in the mathematical equation (1) indicated above are predetermined depending upon the presently established one of the shifting modes of the step-variable transmission portion 20, the specific shifting action of the step-variable transmission portion 20 to be performed between the AT gear positions, and the specific shifting action of the transmission device 40 to be performed between the overall speed positions, namely, depending upon which one of the shifting modes (such as the above-described power-on shift-up mode, power-off shift-up mode, power-on shift-down mode and power-off shift-up mode) of the step-variable transmission portion 20 is to be established, between which AT gear positions the shifting action is to be performed by the step-variable transmission portion 20, and between which overall speed positions the shifting action is to be performed by the transmission device 40, so as to achieve the shifting action adequately. The engine torque Te in the mathematical equation (1) is a required engine torque Tedem at the engine speed ωe at which the engine power Pe for obtaining the required vehicle drive power Pdem (i.e., required engine power Pedem) is obtained.

The AT-transmitted torque Tat in the mathematical equation (1) is a sum of the torque values of the intermediate power transmitting member 30 (the rotating speed of which is taken along the "in" axis) which are obtained by conversion from the CB-transmitted torques Tcb transmitted through the respective two coupling devices CB during the relevant shifting action of the step-variable transmission portion 20, namely, the torque value of the intermediate power transmitting member 30 obtained by conversion from the torque transmitted through the step-variable transmission portion 20. The mathematical equation (1) is an equation for a theoretical mode of the shifting action of the step-variable transmission portion 20. In this respect, the CB-transmitted torque Tcb of the initiative coupling device CB which is controlled to progressively implement the shifting action is used as the AT-transmitted torque Tat in the mathematical equation (1). The CB-transmitted torque Tcb used as the AT-transmitted torque Tat in the mathematical equation (1) is a feed-forward value. To determine the desired CB-transmitted torque Tcb, the electronic control device 80 sets the CB-transmitted torque Tcb of the initiative coupling device CB. Specifically, the electronic control device 80 sets the CB-transmitted torque Tcb of the initiative coupling device CB corresponding to the AT input torque Ti based on the required engine power Pedem achieving the required vehicle drive power Pdem, and according to an appropriate one of a plurality of predetermined relationships between the CB-transmitted torque Tcb and the required input torque, which are formulated to ensure a good balance between the shifting shock and the required shifting time of the step-variable transmission portion 20 and which correspond to respective different combinations of the presently established shifting mode and the specific shifting action of the step-variable transmission portion 20 to be performed between the AT gear positions.

By the way, upon switching of a running state of the hybrid vehicle 10 from the power-on state to the power-off state, with the accelerator pedal being returned to its fully released or non-operated position during a power-on shift-down action of the step-variable transmission portion 20 in the power-on state, an adequate progress of the shift-down action is difficult according to an ordinary control of the torque Tcb transmitted through the releasing-side coupling device CB. Therefore, the electronic control device 80 is configured to implement a control to reduce the transmitted torque Tcb of the releasing-side coupling device CB, that is, a hydraulic pressure control to lower a releasing hydraulic pressure PRcb1 of the releasing-side coupling device CB. Where the regenerative torque of the second electric motor MG2 (MG2 torque Tm) is applied to the input shaft (intermediate power transmitting member 30) of the step-variable transmission portion 20, at this time, an absolute value of a negative AT input torque Ti of the step-variable transmission portion 20 is comparatively large. This negative AT input torque Ti causes a reverse progress of the shift-down action, so that synchronization of the AT input speed ωi is delayed with respect to a rise of an engaging hydraulic pressure PRcb2 of the engaging-side coupling device CB and consequent initiation of the inertia phase of the shift-down action, whereby the engaging-side coupling device is abruptly brought into the engaged state prior to a moment of the speed synchronization, giving rise to a risk of generation of an engaging shock of the engaging-side coupling device CB. It is noted that the "reverse progress" of the shift-down action is interpreted to mean a drop of the AT input speed ωi.

Figure 7:
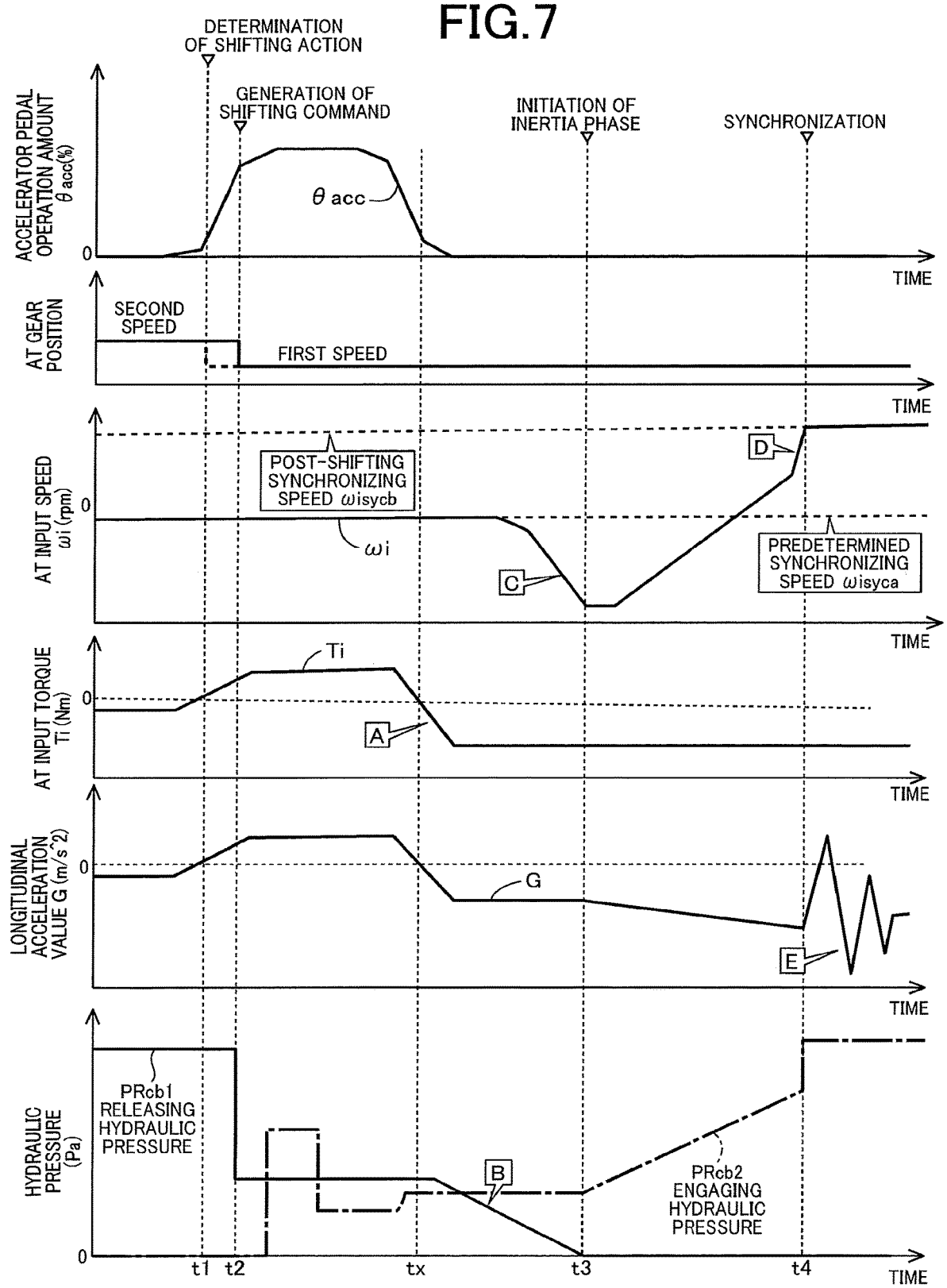
FIG. 7 is a time chart illustrating an example of changes of various parameters when a running state of the vehicle is switched from a power-on state to a power-off state during a shift-down action of the step-variable transmission portion in the power-on state.

FIG. 7 is the time chart illustrating an example of changes of various parameters when the running state of the vehicle 10 is switched from the power-on state to the power-off state during the power-on shift-down action of the step-variable transmission portion 20 (e.g., from the second speed AT gear position to the first speed AT gear position) in the power-on state. As shown in FIG. 7, the determination of requirement for the power-on shift-down action is made at a point of time t1, and a shifting command to implement the power-on shift-down action is then generated at a point of time t2. Subsequently, the inertia phase of the shift-down action is initiated at a point of time t3, and the AT input speed ωi has been raised to a value substantially equal to a post-shifting synchronizing speed ωisycb, at a point of time t4. A point of time tx is a moment at which switching of the vehicle running state from the power-on state to the power-off state is almost completed.

At a point of time shortly after the point of time tx during the power-on shift-down action of the step-variable transmission portion 20, the vehicle running state has been switched to the power-off state (to the non-running state) with the accelerator pedal being returned to its non-operated state, so that the AT input torque Ti of the step-variable transmission portion 20 is reduced to a negative value with the regenerative torque of the second electric motor MG2 (MG2 torque Tm), as indicated by an arrow symbol "A". At this time, a determination of the switching of the vehicle running state is made, and the releasing hydraulic pressure PRcb1 of the releasing-side coupling device CB is lowered (as indicated by an arrow symbol "B"). A time period during which the releasing hydraulic pressure PRcb1 of the releasing-side coupling device CB is lowered precedes a moment of initiation of a rise of the engaging hydraulic pressure PRcb2 of the engaging-side coupling device CB. Namely, during the above-indicated time period, generation of the engaging torque Tcb by the engaging-side coupling device CB is not yet initiated, or the generated engaging torque Tcb is still small and the AT input torque Ti has a negative value, so that the shift-down action progresses in the reverse direction (as indicated by an arrow symbol "C"). At the point of time t3, a gradual rise of the engaging hydraulic pressure PRcb2 is initiated, and the inertia phase of the shift-down action is initiated. However, the reverse progress of the shift-down action during the above-indicated time period causes an increase of a difference between the AT input speed ωi and the post-shifting synchronizing speed ωisycb. The speed synchronization is not completed prior to the point of time t4, and the engaging-side coupling device CB is abruptly brought into its fully engaged state while the AT input speed ωi is abruptly raised to the post-shifting synchronizing speed ωisycb, at the point of time t4, whereby an engaging shock of the engaging-side coupling device CB is generated (as indicated by an arrow symbol "E").

In view of the above-described risk of generation of the engaging shock, the electronic control device 80 is configured to implement a control of the AT input torque Ti of the step-variable transmission portion 20 upon switching of the vehicle running state from the power-on state to the power-off state during the shift-down action of the step-variable transmission portion 20 in the power-on state, such that the AT input torque Ti is controlled so as to be not smaller than a predetermined lower limit Tif. This control of the AT input torque Ti makes it possible to reduce the risk of the reverse progress of the shift-down action of the step-variable transmission portion 20 and consequent generation of the engaging shock of the engaging-side coupling device CB, even when the vehicle running state is switched from the power-on state to the power-off state during the shift-down action of the automatic transmission portion 20 in the power-on state.

Described more specifically, the electronic control portion 80 includes a vehicle state determining means or portion 86, an accelerator release determining means or portion 88, and an input-torque lower-limit setting means or portion 90 so as to control the AT input torque Ti.

The vehicle state determining portion 86 is configured to determine whether the step-variable transmission portion 20 is in the process of a power-on shift-down action during running of the vehicle 10. This determination is made on the basis of the hydraulic control command signals Sat, for instance. The vehicle state determining portion 86 is further configured to determine whether the inertia phase of the power-on shift-down action of the step-variable transmission portion 20 is initiated in the process of the power-on shift-down action. This determination is made depending upon whether a rise of the AT input speed ωi toward the post-shifting synchronizing speed ωisycb is initiated or not, for example. The vehicle state determining portion 86 is further configured to determine whether the power-on shift-down action of the step-variable transmission portion 20 is terminated or not. This determination is made on the basis of the hydraulic control command signals Sat, for example.

The accelerator release determining portion 88 is configured to determine whether the accelerator pedal has been returned to its non-operated position by the vehicle operator in the process of the power-on shift-down action of the step-variable transmission portion 20. In other words, the accelerator release determining portion 88 determines whether the vehicle running state is switched from the power-on state to the power-off state based on a switching operation to the power-off state. The determination as to whether the accelerator pedal has been returned to its non-operated position or not is made depending upon whether the accelerator pedal operation amount θacc has been reduced to or below a predetermined value close to zero.

While a negative determination that the accelerator pedal has not been returned to its non-operated position is obtained by the accelerator release determining portion 88 in the process of the power-on shift-down action of the step-variable transmission portion 20, the hybrid control portion 84 implements the basic shifting control (ordinary control) of the AT input torque Ti in which the AT input torque Ti is not controlled in a lower-limit setting mode which will be described.

The input-torque lower-limit setting portion 90 is configured to set a lower limit Tif of the AT input torque Ti if an affirmative determination that the accelerator pedal has been returned to its non-operated position is obtained by the accelerator pedal release determining portion 88 in the process of the power-on shift-down action of the step-variable transmission portion 20. In this case, the input-torque lower-limit setting portion 90 applies a command to the input torque control portion in the form of the hybrid control portion 84 to control the AT input torque Ti so as to be not smaller than the lower limit Tif. According to this command, the hybrid control portion 84 controls the AT input torque Ti of the step-variable transmission portion 20 in the process of its power-on shift-down action, in the lower-limit setting mode, such that the AT input torque Ti is not smaller than the lower limit Tif. Where the lower limit Tif set by the input-torque lower-limit setting portion 90 is a negative value, the hybrid control portion 84 controls the AT input torque Ti such that the AT input torque Ti is not larger than the absolute value of the negative lower limit value Tif during the shifting of the step-variable transmission portion 20. Where the lower limit Tif is a positive value, the hybrid control portion 84 controls the AT input torque Ti such that the AT input torque Ti is not smaller than the absolute value of the positive lower limit value Tif during the shifting of the step-variable transmission portion 20.

The hybrid control portion 84 controls the second electric motor MG2 such that the AT input torque Ti is not smaller than the lower limit Tif (such that the MG2 torque Tm is increased), by commanding the second electric motor MG2 to reduce its regenerative torque Tm of the second electric motor MG2 where the lower limit Tif is a negative value, and by commanding the second electric motor MG2 to generate a vehicle driving torque when the lower limit Tif is a positive value. Where it is difficult to control the AT input torque Ti so as to be not smaller than the lower limit Tif, by controlling the MG2 torque Tm of the second electric motor MG2, since the output of the second electric motor MG2 is limited, for instance, the hybrid control portion 84 commands the engine 14 to increase its torque Te, or commands the second electric motor MG2 and the engine 14 to increase both of the MG2 torque Tm and the engine torque Te, so that the AT input torque Ti is not smaller than the lower limit Tif.

The lower limit Tif to be set by the input-torque lower-limit setting portion 90 is determined by experimentation or theoretical calculation or analysis, such that the step-variable transmission portion 20 is enabled to perform the shift-down action without a reverse progress upon switching of the vehicle running state from the power-on state to the power-off state during the power-on shift-down action of the step-variable transmission portion 20, when the AT input torque Ti is not smaller than the lower limit Tif. Since the AT input torque Ti is controlled so as to be not smaller than the lower limit Tif determined as described above, the power-on shift-down action can be adequately implemented with its inertia phase being initiated without its reverse progress, upon switching of the vehicle running state to the power-off state during the power-on shift-down action in the power-on state. The hybrid control portion 84 controls the AT input torque Ti so as to be not smaller than the lower limit Tif not only before initiation of the inertia phase but also during the inertia phase while implementing the basic shifting control.

The lower limit Tif of the input torque Ti is determined and set on the basis of at least one of the following three parameters: a kind of the shift-down action of the step-variable transmission portion 20; the running speed V of the hybrid vehicle 10; and the temperature Toil of the working fluid for the step-variable transmission portion 20. Where the vehicle running speed V is comparatively high, the difference between the AT input speed ωi and the post-shifting synchronizing speed ωisycb is larger than where the vehicle running speed V is comparatively low. In view of this fact, the lower limit Tif is set to be larger when the vehicle running speed V is comparatively high than when it is comparatively low. For example, the input-torque lower-limit setting portion 90 has a predetermined lower-limit setting map stored in its memory, which lower-limit setting map represents a relationship between at least one of the above-described three parameters and the lower limit Tif above which the reverse progress of the shift-down action of the step-variable transmission portion 20 can be prevented. The input-torque lower-limit setting portion 90 sets the lower limit Tif according to the lower-limit setting map.

When the vehicle state determining portion 86 determines that the shift-down action of the step-variable transmission portion 20 is terminated, the input-torque lower-limit setting portion 90 cancels the command to the hybrid control portion 84 to control the AT input torque Ti so as to be not smaller than the lower limit Tif. As a result, the hybrid control portion 84 terminates the control to control the AT input torque Ti so as to be not smaller than the lower limit Tif. The above-indicated command may be cancelled even where the required vehicle drive force is increased as a result of an operation of the accelerator pedal by the vehicle operator after once released, namely, even where the AT input torque Ti is again controlled as defined for the power-on state of the vehicle running. Further, the command to control the AT input torque Ti so as to be not smaller than the lower limit Tif may be cancelled after the switching of the vehicle running state to the power-off state and subsequent initiation of the hydraulic control of the power-off shift-down action, when it is determined that there is no risk of reverse progress of the power-off shift-down, because of a rise of the engaging hydraulic pressure PRcb2 of the engaging-side coupling device CB above a predetermined value.

Figure 8:
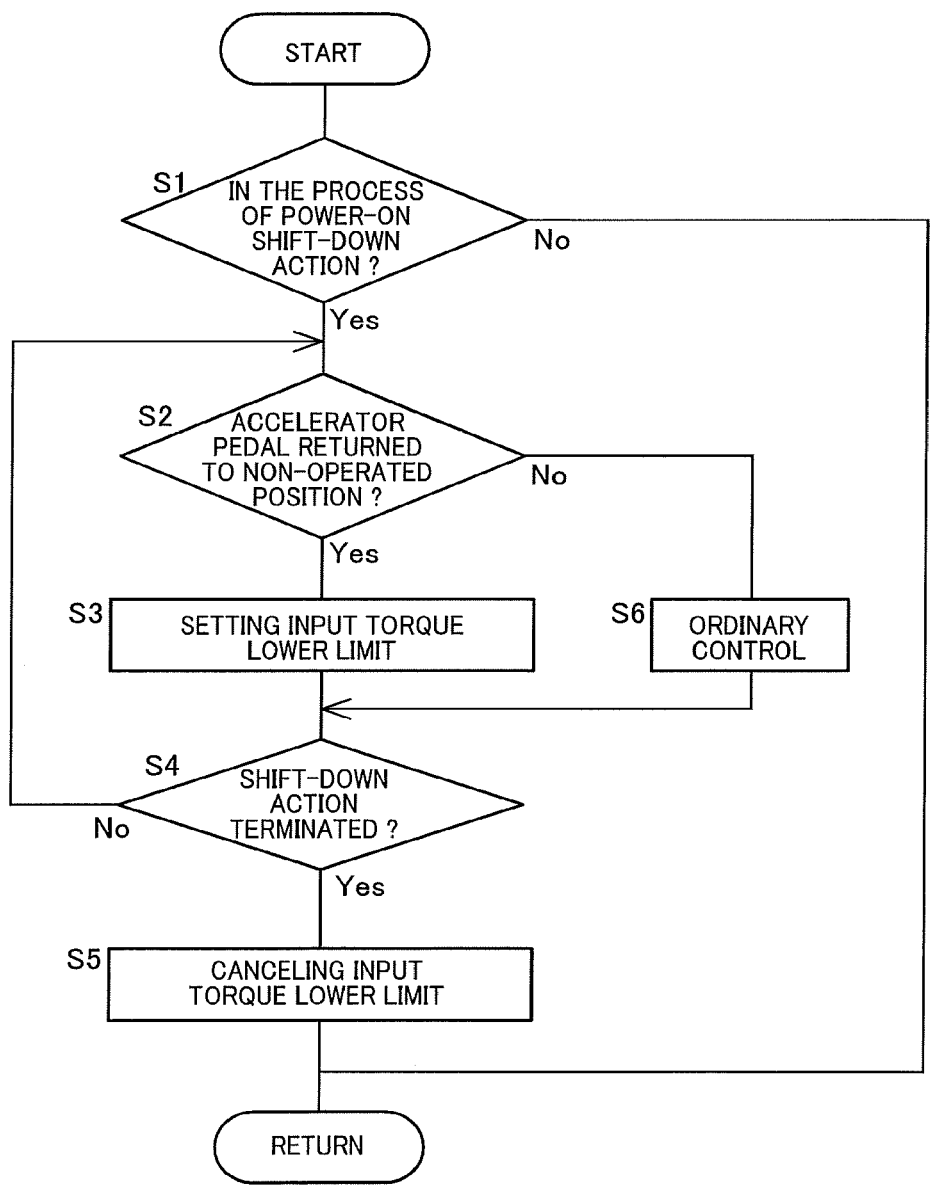
FIG. 8 is a flow chart illustrating an essential part of a control routine executed by an electronic control device, namely, a control operation to reduce a shifting shock of the step-variable transmission portion upon switching of the vehicle running state from the power-on state to the power-off state during the shift-down action of the step-variable transmission portion in the power-on state.

FIG. 8 is the flow chart illustrating an essential part of a control routine executed by the electronic control device 80, namely, a control operation to reduce a risk of generation of a shifting shock of the step-variable transmission portion 20 upon switching of the vehicle running state from the power-on state to the power-off state during the power-on shift-down action of the step-variable transmission portion 20. This control routine is repeatedly executed during running of the hybrid vehicle 10.

The control routine of FIG. 8 is initiated with a step S1 corresponding to the function of the vehicle state determining portion 86, to determine whether the step-variable transmission portion 20 is in the process of a power-on shift-down action. If a negative determination is obtained in the step S1, one cycle of execution of the control routine is terminated. If an affirmative determination is obtained in the step S1, the control flow goes to a step S2 corresponding to the function of the accelerator release determining portion 88, to determine whether the accelerator pedal has been returned to its non-operated position, namely, whether the vehicle running state has been switched to the power-off state. If a negative determination is obtained in the step S2, the control flow goes to a step S6 corresponding to the function of the hybrid control portion 84, the ordinary control (basic shifting control) is implemented, and the control flow then goes to a step S4. If an affirmative determination is obtained in the step S2, the control flow goes to a step S3 corresponding to the functions of the input-torque lower-limit setting portion 90 and the hybrid control portion 84, to control the AT input torque Ti so as to be not smaller than the lower limit Tif. The steps S3 and S6 are followed by the step S4 corresponding to the function of the vehicle state determining portion 86, to determine whether the shift-down action of the step-variable transmission portion 20 is terminated. If a negative determination is obtained in the step S4, the control flow goes to the step S2. If an affirmative determination is obtained in the step S4, the control flow goes to a step S5 corresponding to the input-torque lower-limit setting portion 90, to cancel the setting of the lower-limit Tif of the AT input torque Ti, if the setting is established, and one cycle of execution of the present control routine is terminated.

Figure 9:
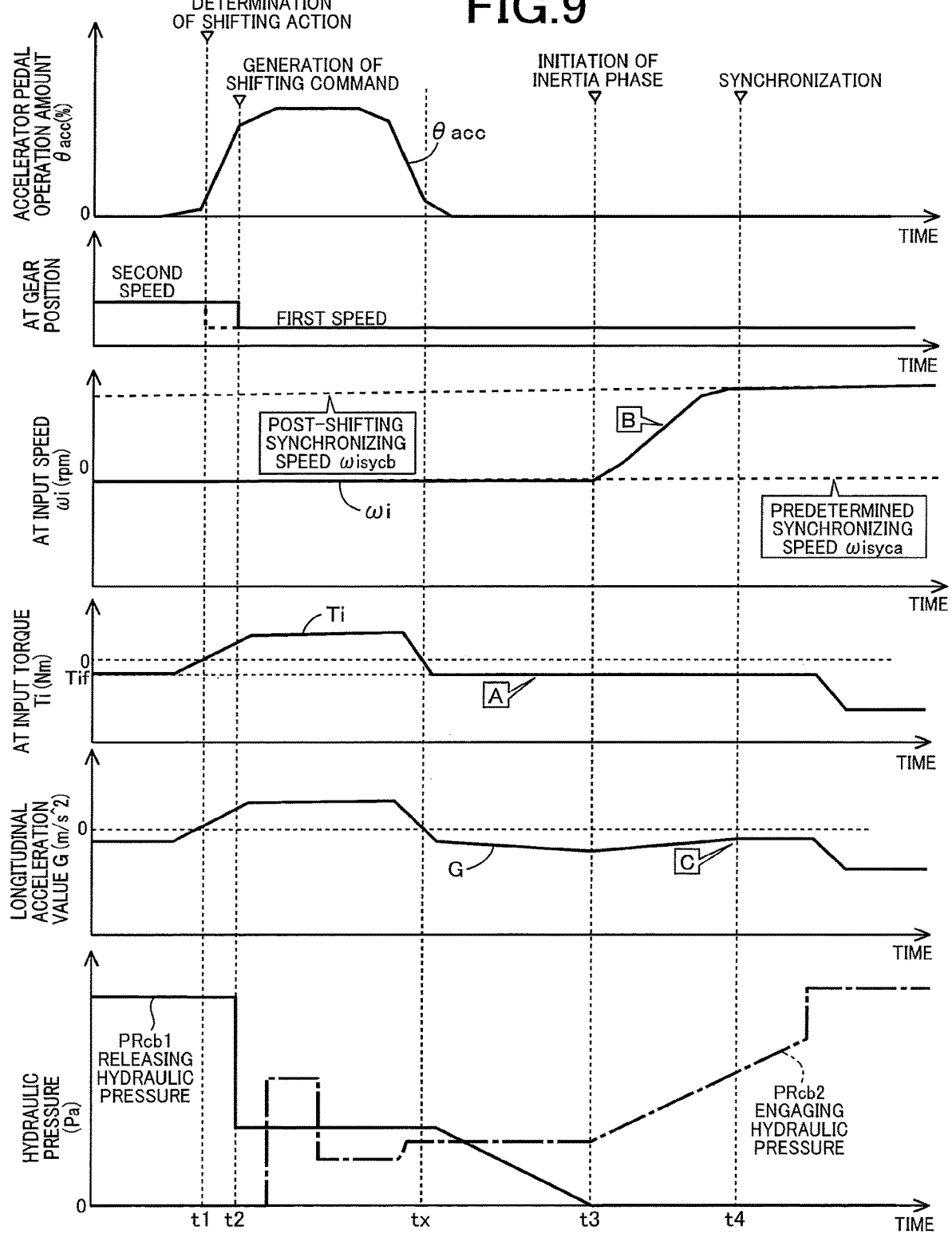
FIG. 9 is a time chart illustrating an example of changes of various parameters when the control routine illustrated in the flow chart of FIG. 8 is executed.

FIG. 9 is the time chart illustrating an example of changes of various parameters when the control routine illustrated in the flow chart of FIG. 8 is executed. As shown in FIG. 9, the determination of requirement for the power-on shift-down action is made at a point of time t1, and a shifting command to implement the power-on shift-down action is then generated at a point of time t2. Subsequently, the inertia phase of the shift-down action is initiated at a point of time t3, and the AT input speed $\omega i$ has been raised to a value substantially equal to the post-shifting synchronizing speed $\omega isycb$, at a point of time t4. A point of time tx is a moment at which switching of the vehicle running state from the power-on state to the power-off state is almost completed. At the point of time tx, the AT input torque Ti is reduced to zero, and the vehicle running state has been switched from the power-on state to the power-off state, as a result of the releasing operation of the accelerator pedal to the non-operated position. At this time, the lower limit Tif of the AT input torque Ti is set, so that the AT input torque Ti is held not smaller than the lower limit Tif, after the point of time tx (as indicated by an arrow symbol "A"). Accordingly, the inertia phase of the shift-down action of the step-variable transmission portion 20 is initiated at the point of time t3, without a drop of the AT input speed $\omega i$ (without a reverse progress of the shift-down action) after the time tx. After the moment of initiation of the inertia phase, the AT input speed $\omega i$ is raised at an adequate rate according to the basic shifting control (as indicated by an arrow symbol "B"), and the speed synchronization is completed at the point of time t4 (as indicated by an arrow symbol "C"). Thus, the control routine of FIG. 9 permits reduction of the risk of generation of an engaging shock of the engaging-side coupling device CB due to its abrupt engaging action.

As described above, the present embodiment is configured such that the AT input torque Ti of the step-variable transmission portion 20 is controlled so as to be not smaller than the lower limit Tif, even where the running state of the hybrid vehicle 10 is switched to the power-off state during the shift-down action of the step-variable transmission portion 20 in the power-on state. Accordingly, the shift-down action can be adequately implemented without a reverse progress. Thus, the present embodiment permits reduction of a risk of the reverse progress of the shift-down action of the step-variable transmission portion 20 and consequent generation of its shifting shock upon switching of the vehicle running state to the power-off state.

The present embodiment is further configured such that the lower limit Tif of the input torque Ti is set at a value above which the step-variable transmission portion 20 is enabled to perform the shift-down action without a reverse progress. Since the AT input torque Ti is controlled so as to be not smaller than the thus set lower limit Tif even where the running state of the hybrid vehicle 10 is switched to the power-off state, the risk of the reverse progress of the shift-down action of the step-variable transmission portion 20 can be reduced. In addition, the present embodiment is configured such that the lower limit Tif of the AT input torque Ti that prevents the reverse progress of the shift-down action can be adequately set on the basis of at least one of the kind of the shift-down action of the step-variable transmission portion 20, the running speed V of the hybrid vehicle 10 and the temperature Toil of the working fluid.

While the preferred embodiment of this invention has been described in detail by reference to the drawings, it is to be understood that the invention may be otherwise embodied.

In the illustrated embodiments, the control of the AT input torque Ti so as to be not smaller than the lower limit Tif is initiated at the moment of switching of the vehicle running state from the power-on state to the power-off state. However, the moment of initiation of this control of the AT input torque Ti may be determined depending upon the state of progress of the shift-down action of the step-variable transmission portion 20 (namely, a difference between the AT input speed $\omega i$ and the post-shifting synchronizing speed $\omega isycb$), a length of time after the moment of initiation of the shift-down action, or a length of time after the moment of initiation of the inertia phase of the shift-down action. Where the difference between the AT input speed $\omega i$ and the post-shifting synchronizing speed $\omega isycb$ is smaller than a predetermined value, the moment of initiation of the control in question may be delayed from the moment of switching of the vehicle running state to the power-off state. Where there is no risk of the reverse progress of the shift-down action since the releasing hydraulic pressure PRcb1 of the releasing-side coupling device CB at the moment of switching of the vehicle running state to the power-off state is not lower than a predetermined value, the moment of initiation of the control in question may be delayed by a length of time from the moment of initiation of the shift-down action to the moment at which the releasing hydraulic pressure PRcb1 has been lowered below a predetermined value.

In the illustrated embodiments, the AT input torque Ti is held not smaller than the lower limit Tif until a moment of termination of the shift-down action of the step-variable transmission portion 20. However, the moment of termination of this control of the AT input torque Ti so as to be not smaller than the lower limit Tif may be determined depending upon the state of progress of the shift-down action of the step-variable transmission portion 20 (namely, a difference between the AT input speed $\omega i$ and the post-shifting synchronizing speed $\omega isycb$), the length of time after the moment of initiation of the shift-down action, or the length of time after the moment of initiation of the inertia phase of the shift-down action. In this respect, it is noted, for example, that the engaging torque Tcb of the releasing-side coupling device CB is lowered to zero at the moment near the termination of the shift-down action, and the engaging torque Tcb of the engaging-side coupling device CB is relatively large, so that there is a low risk of the reverse progress of the shift-down action even after the control of the AT input torque Ti so as to be not smaller than the lower limit Tif is terminated. Accordingly, the relevant control of the AT input torque Ti may be terminated before the moment of termination of the shift-down action, namely, at a moment of the progress of the shift-down action immediately prior to the moment of termination of the shift-down action, or at a moment immediately prior to a moment of elapsing of the length of time from the moment of initiation of the shift-down action or the length of time from the moment of initiation of the inertia phase, which length of time corresponds to the moment of termination of the shift-down action.

Figure 10:
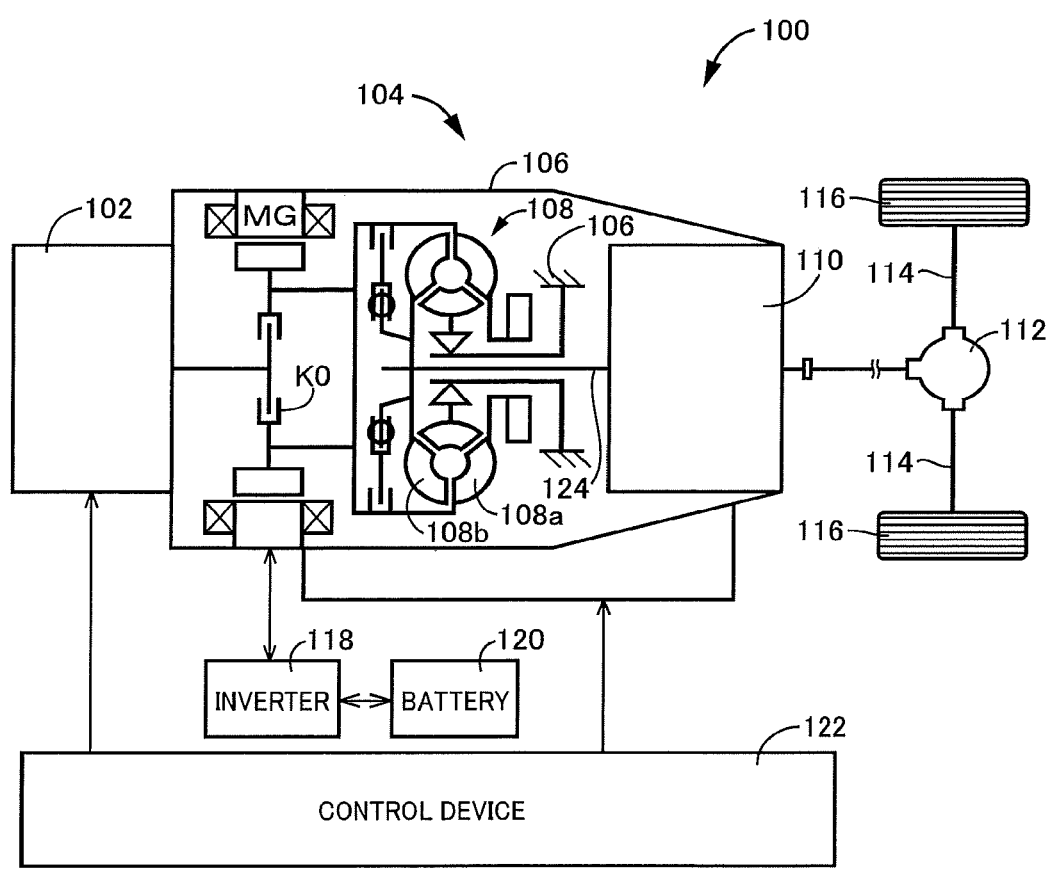
FIG. 10 is a schematic view showing an arrangement of another type of a vehicular drive system different from that of FIG. 1, which is to be controlled by the control apparatus according to the present invention.

In the preceding embodiment, the control apparatus is configured to control the vehicle 10 provided with the continuously variable transmission portion 18 and the step-variable transmission portion 20 which are disposed in series with each other. However, the control apparatus according to the present invention may be configured to control a vehicle 100 shown in FIG. 10. The vehicle 100 which is controlled by the control apparatus in the form of a control device 122 according to this embodiment is a hybrid vehicle provided with an engine 102 and an electric motor MG functioning as the drive power source, and a power transmitting system 104. As shown in FIG. 10, the power transmitting system 104 includes a clutch KO, a torque converter 108 and a step-variable transmission portion 110, which are disposed within a stationary member in the form of a casing 106 fixed to a body of the vehicle 100, in this order of description as seen in the direction from the engine 102. The power transmitting system 104 further includes a differential gear device 112 and axles 114. The torque converter 108 has a pump impeller 108a selectively connected to the engine 102 through the clutch KO and directly connected to the electric motor MG, and a turbine impeller 108b directly connected to the step-variable transmission portion 110. In the power transmitting system 104, a drive force of the engine 102 and/or a drive force of the electric motor MG are/is transmitted to drive wheels 116 of the vehicle 100 through the clutch KO (where the drive force of the engine 102 is transmitted), the torque converter 108, the step-variable transmission portion 110, the differential gear device 112 and the axles 114, in this order of description. The step-variable transmission portion 110 is an automatic transmission which constitutes a part of a power transmitting path between the drive power source (engine 102 and electric motor MG) and the drive wheels 116, and which is placed in a selected one of a plurality of gear positions with engagement of selected at least one of a plurality of coupling devices. The vehicle 100 is further provided with an inverter 118, and an electric power storage device in the form of a battery 120 to and from which an electric power is respectively supplied from and to the electric motor MG through the inverter 118, as well as the above-indicated control device 122. The control device 122 is configured to control an AT input torque Ti during a shifting action of the step-variable transmission portion 110, on the basis of the engine torque Te and the CB-transmitted torque of the relevant coupling device CB such that a value representing a state of a rotary motion of an input shaft 124 which is an input rotary member of the step-variable transmission portion 110 coincides with a predetermined target value. For example, the value representing the state of the rotary motion of the input shaft 124 is an AT input speed ωi which is a rotating speed of the input shaft 124, or an AT angular acceleration value dωi/dt which is an angular acceleration value of the input shaft 124. In essence, the control apparatus of the present invention is applicable to a hybrid vehicle provided with an engine and an electric motor functioning as a drive power source, and an automatic transmission portion which constitutes a part of a power transmitting path between the drive power source and drive wheels and which is placed in a selected one of speed positions with engagement of selected at least one of a plurality of coupling devices. Although the vehicle 100 includes a fluid-operated power transmitting device in the form of the torque converter 108, the torque converter 108 may be replaced by another other fluid-operated power transmitting device such as a fluid coupling not having a torque boosting function. Further, the torque converter 108 need not be provided, or may be replaced by a device having only a clutch function.

The basic shifting control of the transmission device 40 (e.g., the shifting control using the mathematical equation (1) given above) in the illustrated embodiments is applicable to the shifting operation of the step-variable transmission portion 20 while the transmission device 40 as a whole is operated as a continuously variable transmission, as well as to the shifting operation of the step-variable transmission portion 20 while the transmission device 40 is shifted between the overall speed positions stepwise.

In the illustrated embodiments, the step-variable transmission portion 20 is a planetary gear type automatic transmission having the four AT gear positions for forward driving of the vehicle 10. However, the step-variable transmission portion 20 need not have the four AT gear positions, as long as the step-variable transmission portion 20 has a plurality of gear positions each of which is selectively established with engagement of selected at least one of a plurality of coupling devices. That is, the step-variable transmission portion 20 which is the planetary gear type automatic transmission in the embodiments may be replaced by any other type of automatic transmission such as a known DCT (Dual Clutch Transmission) which is a synchronous meshing parallel two-axes type automatic transmission having two input shafts which are provided with respective coupling devices (clutches) and which are operatively connected to respective two shifting units having respective even-numbered gear positions and odd-numbered gear positions. In the DCT type automatic transmission, coupling devices each connected to respective inputs of the two shifting units correspond to the selected ones of a plurality of coupling devices of the present invention.

In the illustrated embodiments, the transmission device 40 as a whole is shifted to a selected one of the overall speed positions, like a step-variable transmission, according to the overall speed position shifting map. However, the transmission device 40 may be shifted to the selected overall speed position according to an operation of the shift lever 56, a shift-up/shift-down switch or any other member operated by the vehicle operator to shift the transmission device 40.

In the illustrated embodiments, the ten overall speed positions are established for the four AT gear positions. Although the number of the overall speed positions may be equal to the number of the AT gear positions, the number of the overall speed positions is preferably larger than the number of the AT gear positions, for instance, twice or more of the number of the AT gear positions. The numbers of the AT gear positions and the overall speed positions are suitably determined, as long as the step-variable transmission portion is shifted such that the rotating speed of the intermediate power transmitting member 30 and the operating speed of the second electric motor MG2 connected to the intermediate power transmitting member 30 are held within respective predetermined ranges, and the transmission device 40 is shifted such that the engine speed ωe is held with a predetermined range.

In the illustrated embodiments, the differential mechanism 32 is the planetary gear set of the single-pinion type having the three rotary elements. However, the differential mechanism 32 may be replaced by a differential mechanism including a plurality of planetary gear sets which are connected to each other and which have four or more rotary elements. Alternatively, the differential mechanism 32 may be a planetary gear set of a double-pinion type, or a differential gear device including a pinion rotated by the engine 14 and a pair of bevel gears which mesh with the pinion and which are connected to the first electric motor MG-1 and the intermediate power transmitting member 30.

It is to be understood that the embodiments and modifications described above are given for illustrative purpose only, and that the present invention may be embodied with various other changes and improvements which may occur to those skilled in the art.

NOMENCLATURE OF ELEMENTS 10, 100: Vehicle (Hybrid vehicle)
14, 102: Engine
20, 110: Step-variable transmission portion (Automatic transmission)
28, 116: Drive wheels
30: Intermediate power transmitting member (Input rotary member)
32: Differential mechanism
80, 122: Electronic control device (Control apparatus)
84: Hybrid control portion (Input torque control portion)
90: Input-torque lower-limit setting portion
CB: Coupling devices
MG: Electric motor
MG1: First electric motor
MG2: Second electric motor (Electric motor)
RE1-RE3: First through third rotary elements

What is claimed is:

1. A control apparatus for a hybrid vehicle provided with an engine and an electric motor which function as a drive power source, and an automatic transmission which constitutes a part of a power transmitting path between the drive power source and vehicle drive wheels and which is placed in a selected one of a plurality of speed positions with engagement of selected at least one of a plurality of coupling devices, said control apparatus comprising:
an input torque control portion configured to control the electric motor for controlling an input torque transmitted to the automatic transmission during a shifting action of the automatic transmission, on the basis of an output torque of the engine and a torque transmitted through the coupling devices, such that a value representing a rotating state of an input rotary member of the automatic transmission coincides with a target value,
and wherein the input torque control portion controls the input torque so as to be not smaller than a predetermined lower limit, when a running state of the hybrid vehicle is switched from a power-on state to a power-off state during a shift-down action of the automatic transmission in the power-on state.

2. The control apparatus according to claim 1, wherein the lower limit of the input torque is set at a value above which the automatic transmission is enabled to perform the shift-down action without a reverse progress.

3. The control apparatus according to claim 2, further comprising an input-torque lower-limit setting portion configured to set the lower limit of the input torque of the automatic transmission on the basis of at least one of a kind of the shift-down action of the automatic transmission, a running speed of the hybrid vehicle and a temperature (Toil) of a working fluid for the automatic transmission.

4. The control apparatus according to claim 3, wherein the input torque control portion implements a control to increase at least one of an output torque of the electric motor and the output torque of the engine, when the input torque is controlled so as to be not smaller than the lower limit of the input torque.

5. The control apparatus according to claim 4, wherein the hybrid vehicle is further provided with a differential mechanism having a first rotary element operatively connected to the engine in a power transmittable manner, a second rotary element operatively connected to a first electric motor in a power transmittable manner, and a third rotary element operatively connected to the input rotary member and a second electric motor in a power transmittable manner,
and wherein said electric motor of the drive power source is the second electric motor operatively connected to the third rotary element.

6. The control apparatus according to claim 3, wherein the hybrid vehicle is further provided with a differential mechanism having a first rotary element operatively connected to the engine in a power transmittable manner, a second rotary element operatively connected to a first electric motor in a power transmittable manner, and a third rotary element operatively connected to the input rotary member and a second electric motor in a power transmittable manner,
and wherein said electric motor of the drive power source is the second electric motor operatively connected to the third rotary element.

7. The control apparatus according to claim 2, wherein the input torque control portion implements a control to increase at least one of an output torque of the electric motor and the output torque of the engine, when the input torque is controlled so as to be not smaller than the lower limit of the input torque.

8. The control apparatus according to claim 7, wherein the hybrid vehicle is further provided with a differential mechanism having a first rotary element operatively connected to the engine in a power transmittable manner, a second rotary element operatively connected to a first electric motor in a power transmittable manner, and a third rotary element operatively connected to the input rotary member and a second electric motor in a power transmittable manner,
and wherein said electric motor of the drive power source is the second electric motor operatively connected to the third rotary element.

9. The control apparatus according to claim 2, wherein the hybrid vehicle is further provided with a differential mechanism having a first rotary element operatively connected to the engine in a power transmittable manner, a second rotary element operatively connected to a first electric motor in a power transmittable manner, and a third rotary element operatively connected to the input rotary member and a second electric motor in a power transmittable manner, and wherein said electric motor of the drive power source is the second electric motor operatively connected to the third rotary element.

10. The control apparatus according to claim 1, wherein the input torque control portion implements a control to increase at least one of an output torque of the electric motor and the output torque of the engine, when the input torque is controlled so as to be not smaller than the lower limit of the input torque.

11. The control apparatus according to claim 10, wherein the hybrid vehicle is further provided with a differential mechanism having a first rotary element operatively connected to the engine in a power transmittable manner, a second rotary element operatively connected to a first electric motor in a power transmittable manner, and a third rotary element operatively connected to the input rotary member and a second electric motor in a power transmittable manner, and wherein said electric motor of the drive power source is the second electric motor operatively connected to the third rotary element.

12. The control apparatus according to claim 1, wherein the hybrid vehicle is further provided with a differential mechanism having a first rotary element operatively connected to the engine in a power transmittable manner, a second rotary element operatively connected to a first electric motor in a power transmittable manner, and a third rotary element operatively connected to the input rotary member and a second electric motor in a power transmittable manner, and wherein said electric motor of the drive power source is the second electric motor operatively connected to the third rotary element.

* * * * *